(12) United States Patent
Hoppensteadt

(10) Patent No.: US 7,783,584 B1
(45) Date of Patent: Aug. 24, 2010

(54) CONTROLLABLE OSCILLATOR BLOCKS

(75) Inventor: Frank C. Hoppensteadt, New York, NY (US)

(73) Assignee: New York University, New York, NY (US)

( * ) Notice: Subject to any disclaimer, the term of this patent is extended or adjusted under 35 U.S.C. 154(b) by 517 days.

(21) Appl. No.: 11/866,613

(22) Filed: Oct. 3, 2007

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ..................................................... 706/15
(58) Field of Classification Search ................... 706/15
See application file for complete search history.

(56) References Cited

U.S. PATENT DOCUMENTS

| 6,404,292 | B1 * | 6/2002 | Lautzenhiser | 331/17 |
| 6,867,656 | B2 * | 3/2005 | Hajimiri et al. | 331/45 |
| 6,957,204 | B1 | 10/2005 | Hoppensteadt et al. | |
| 7,280,989 | B1 | 10/2007 | Hoppensteadt et al. | |
| 7,348,818 | B2 * | 3/2008 | Hulfachor et al. | 327/156 |
| 7,479,834 | B2 * | 1/2009 | Koukab et al. | 331/16 |

OTHER PUBLICATIONS

Simple and composed classifiers used for classification of experimental data, Vyrostkova, J.; Ocelikova, E.; Klimesova, D.; Human System Interactions, 2008 Conference on Digital Object Identifier: 10.1109/HSI.2008.4581460 Publication Year: 2008 , pp. 340-343.*
Real-time emulation for power equipment development. II. The virtual machine Slater, H.J.; Atkinson, D.J.; Jack, A.G.; Electric Power Applications, IEE Proceedings—vol. 145 , Issue: 3 Publication Year: 1998 , pp. 153-158.*
Digital spectra of nonuniformly sampled signals. II. Digital look-up tunable sinusoidal oscillators, Jenq, Y.C.; Instrumentation and Measurement, IEEE Transactions on vol. 37 , Issue: 3 Digital Object Identifier: 10.1109/19.7455 Publication Year: 1988 , pp. 358-362.*
An All-Digital Phase-Locked Loop with High-Resolution for SoC Applications, Duo Sheng; Ching-Che Chung; Chen-Yi Lee; VLSI Design, Automation and Test, 2006 International Symposium on Digital Object Identifier: 10.1109/VDAT.2006.258161 Publication Year: 2006 , pp. 1-4.*

(Continued)

*Primary Examiner*—Michael Holmes
(74) *Attorney, Agent, or Firm*—Withrow & Terranova, P.L.L.C.

(57) ABSTRACT

The present invention mimics certain behaviors of a human brain using at least one frequency controllable oscillator block that has multiple operating frequency regions, such that some of the regions tend to lock on to a frequency, while other regions do not have any locking tendencies. A stimulation using at least one stimulation signal based on information input to the system may alter the regions and determine a stable final frequency after a brief processing interval. A control system may process the final frequency to provide system information. A controllable oscillator block may have at least one basin of attraction that corresponds with a stable region of the stimulation signal. Additionally, the controllable oscillator block may function outside of a basin of attraction that corresponds with a non-stable region of the stimulation signal.

25 Claims, 14 Drawing Sheets

OTHER PUBLICATIONS

Bunyk, Paul et al., "RSFQ Technology: Physics and Devices," Intl. Journal on High Speed Electronics and Systems, 2001, pp. 257-306, vol. 11, No. 1.

Flaherty, J.E. et al., "Frequency Entrainment of a Forced van per Pol Oscillator," Studies in Applied Mathematics, 1978, pp. 5-15, vol. 58, Elsevier North Holland, Inc.

Hoppensteadt, Frank C., Analysis and Simulation of Chaotic Systems, 2000, pp. 223-234, Springer-Verlag, New York.

Hoppensteadt, Frank C., "Voltage-Controlled Oscillations in Neurons," From Scholarpedia, http://www.scholarpedia.org/articles/Voltage-Controlled_Oscillations_in_Neurons, 2007.

Hoppensteadt, Frank C. et al., "Synchronization of MEMS Resonators and Mechanical Neurocomputing," IEEE Transactions on Circuits and Systems I, 2001, pp. 133-138, vol, 48, IEEE.

Hoppensteadt, Frank C. et al., "Pattern Recognition via Synchronization in Phase-Locked Loop Neural Networks," IEEE Transactions on Neural Networks, 2000, pp. 734-738, vol. 11, IEEE.

Hosoya, Mutsumi et al., "Quantum Flux Parametron: A Single Quantum Flux Device for Josephson Supercomputer," IEEE Transactions on Applied Superconductivity, Jun. 1991, pp. 77-89, vol. 1, No. 2, IEEE.

Izhikevich, Eugene M., "Polychronization: Computation with Spikes," Neural Computation, 2006, pp. 245-282, vol. 18, Massachusetts Institute of Technology.

Izhikevich, Eugene M. et al., "Bursts as a Unit of Neural Information: Selective Communication via Resonance," Trends in Neuroscience, 2003, pp. 161-167, vol. 26.

Likharev, K. K., "Rapid Single-Flux-Quantum Logic," Preprint, http://pavel.physics.sunysb.edu/RSFQ/Research/WhatIs/rsfqre2m.html.

Skorokhod, A., Random Perturbation Methods, 2002, Chapter 10, pp. 343-375, Springer-Verlag, New York.

Yang, Tao et al., "Tunneling Phase Logic Cellular Nonlinear Networks," International Journal of Bifurcation and Chaos, 2001, pp. 2895-2911, vol. 11, No. 12, World Scientific Publishing Company.

* cited by examiner

_US 7,783,584 B1_

CONTROLLABLE OSCILLATOR BLOCKS

FIELD OF THE INVENTION

The present invention relates to controllable oscillator blocks, which may form arrays. The controllable oscillator blocks have output frequencies that may be used to perform complex functions, which may mimic certain functions of a brain, such as pattern recognition and associative memory.

BACKGROUND OF THE INVENTION

As computer systems evolve, many different kinds of tasks are performed using computers; however, when compared with the human brain, computer systems excel in certain areas but come up short in other areas. For example, a computer can perform many mathematical calculations in a very short period of time when compared with a human brain; however, a human child learns very early to recognize his mother's face in a crowd of people. Such face recognition is difficult for computer systems, requiring complicated algorithms and large amounts of processing power. When considering that the human brain can effectively operate at a frequency of about 40 Hertz and central processing units of modern computer systems can operate at frequencies exceeding one Gigahertz, the disparity seems larger. By reproducing some of the processing methods of the human brain, electronic circuitry and computer systems may be able to perform tasks, such as pattern recognition, more efficiently and effectively.

Parts of the human brain have been modeled using electronic circuits for a number of years. In particular, certain neural behaviors can be somewhat reproduced with controllable oscillators and phase-locked loop circuits or, in the mechanical world, with pendulums; however, phase-locked loops have acquisition or lock times that may hinder the effective speed of circuits relying on locking behavior of phase-locked loops. Thus, there is a need for electronic circuitry using controllable oscillator circuitry, which stabilizes quickly and mimics the human brain when processing information.

SUMMARY OF THE INVENTION

The present invention mimics certain behaviors of a human brain using at least one frequency controllable oscillator block that has multiple operating frequency regions, such that some of the regions tend to lock on to a frequency, while other regions do not have any locking tendencies. A stimulation using at least one stimulation signal based on information input to the system may alter the regions and determine a stable final frequency after a brief processing interval. A control system may process the final frequency to provide system information.

A controllable oscillator block may have at least one basin of attraction that corresponds with a stable region of the stimulation signal. Additionally, the controllable oscillator block may function outside of a basin of attraction that corresponds with a non-stable region of the stimulation signal. A stimulation having a stimulation signal within a stable region will produce an output signal within a frequency locking range, whereas a stimulation having a stimulation signal within a non-stable region will produce an output signal within a non-frequency locking range.

Each stimulation may be initiated using a stimulation signal, which may include at least one initialization control signal, a common forcing signal, or both. Initialization control signals are normally applied only at the beginning of a stimulation, whereas common forcing signals are normally applied throughout a stimulation. The output frequencies are provided by one or more output signals after stabilization in response to a stimulation. Each output signal has at least one output frequency, which is processed by other circuitry to establish relationships between different values of the stimulation signal, and their corresponding frequencies provided by the output signal. These relationships may be used to mimic human brain behaviors, such as associative memory.

The initialization control signal may set initial conditions of certain parameters associated with the oscillator block, such as a capacitor voltage. The common forcing signal may include one or more parametric forcing signals that modify behavior of circuitry within the oscillator block. The oscillator block may have multiple basins of attraction that may be manifested as a phase-locked loop having center frequencies and frequency locking ranges that may be modified by specific aspects of the initialization control signal. After stabilization, an output signal may lock to a particular frequency or may have a frequency outside of a lock range, or basin of attraction. Multiple oscillator blocks may form one or more arrays of oscillator blocks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
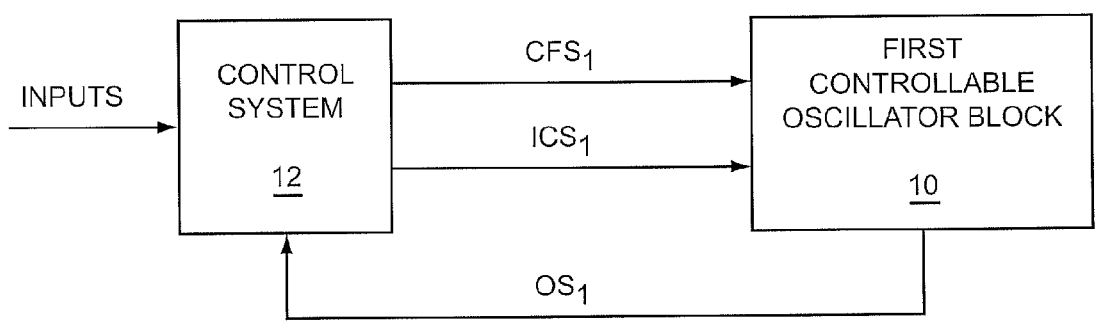
FIG. 1 shows a controllable oscillator block coupled to a control system according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention mimics certain behaviors of a human brain using at least one frequency controllable oscillator block that has multiple operating frequency regions, such that some of the regions tend to lock on to a frequency, while other regions do not have any locking tendencies. A stimulation using at least one stimulation signal based on information input to the system may alter the regions and determine a stable final frequency after a brief processing interval. A control system may process the final frequency to provide system information.

A controllable oscillator block may have at least one basin of attraction that corresponds with a stable region of the stimulation signal. Additionally, the controllable oscillator block may function outside of a basin of attraction that corresponds with a non-stable region of the stimulation signal. A stimulation having a stimulation signal within a stable region will produce an output signal within a frequency locking range, whereas, a stimulation having a stimulation signal within a non-stable region will produce an output signal within a non-frequency locking range.

Each stimulation may be initiated using a stimulation signal, which may include at least one initialization control signal, a common forcing signal, or both. Initialization control signals are normally applied only at the beginning of a stimulation, whereas common forcing signals are normally applied throughout a stimulation. A common forcing signal may establish the basins of attraction, whereas the initiation control signals may determine if the stimulation falls within any of the basins of attraction. The output frequencies are provided by one or more output signals after stabilization in response to a stimulation. Each output signal has at least one output frequency, which is processed by other circuitry to establish relationships between different values of the stimulation signal, and their corresponding frequencies provided by the output signal. These relationships may be used to mimic human brain behaviors, such as associative memory or pattern recognition.

The initialization control signal may set initial conditions of certain parameters associated with the oscillator block, such as a capacitor voltage. The common forcing signal may include one or more parametric forcing signals that modify behavior of circuitry within the oscillator block. The oscillator block may have multiple basins of attraction that may be manifested as a phase-locked loop having center frequencies and frequency locking ranges that may be modified by specific aspects of the initialization control signal. After stabilization, an output signal may lock to a particular frequency or may have a frequency outside of a lock range, or basin of attraction.

Multiple oscillator blocks may form one or more arrays of oscillator blocks. Each array may receive its own common forcing signal. Outputs from some oscillator blocks may provide stimulation inputs to other oscillator blocks.

Different initial conditions may be provided to one or more of the multiple oscillator blocks. Outputs from multiple oscillator blocks may provide coherent output responses to certain stimulation signals and may be used in pattern recognition applications. In one embodiment of the present invention, the controllable oscillator block includes a voltage controlled oscillator neuron (VCON) oscillator coupled to a feedback filter. The VCON oscillator is an oscillator that may mimic neuron-like behaviors. In an alternate embodiment of the present invention, the controllable oscillator block includes phase-locked loop circuitry.

FIG. 1 shows a first controllable oscillator block 10 coupled to a control system 12 according to one embodiment of the present invention. The control system 12 receives system input information INPUTS, which may be processed to extract specific information. For example, in a pattern recognition system, the system input information INPUTS may include digitized fingerprint data, which is processed to match fingerprints saved in a database. The control system 12 provides a stimulation signal that may be based on the system input information INPUTS and may include a first initialization control signal $ICS_1$ and a first common forcing signal $CFS_1$ to the first controllable oscillator block 10. The first initialization control signal $ICS_1$ may set initial conditions of certain parameters associated with the first controllable oscillator block 10, such as one or more initial capacitor voltages. The first common forcing signal $CFS_1$ may include one or more parametric forcing signals that modify behavior of circuitry within the first controllable oscillator block 10. The first controllable oscillator block 10 provides a first output signal $OS_1$, which has at least one output frequency, to the control system 12. After stabilization, the output frequency may be locked to a specific frequency in a basin of attraction, and may be based on the first initialization control signal $ICS_1$, the first common forcing signal $CFS_1$, or both. The control system 12 may provide a system signal (not shown) that is based on processing at least one output frequency.

For example, in a pattern recognition system, the control system 12 may initiate multiple stimulations using the first controllable oscillator block 10. Each stimulation may have a unique combination of the first initialization control and common forcing signals $ICS_1$, $CFS_1$, or combinations common with other stimulations. The first initialization control signals $ICS_1$ may be based on system inputs representing a specific pattern of some type, such as a sampled human voice. The first common forcing signals $CFS_1$ may be based on a stored pattern, such as a specific person's voice. The control system 12 may use the first output signals $OS_1$ and their output frequencies to indicate how well the sampled human voice matches the stored pattern of a specific person's voice. The control system 12 may then analyze the frequencies and decide if the sampled voice matches the stored voice. The control system 12 may then provide the match results in a match results signal (not shown), which feeds a security entry system (not shown). Similar to a pattern recognition system is an associative memory system, which may use the control system 12 to initiate multiple stimulations using the first controllable oscillator block 10. The control system 12 may then analyze the resulting output frequencies and determine if there were any memory associations. The control system 12 may then provide an associative memory signal (not shown) containing memory association information. Alternate embodiments of the present invention may use an array of controllable oscillator blocks, which may perform multiple stimulations simultaneously.

Figure 2:
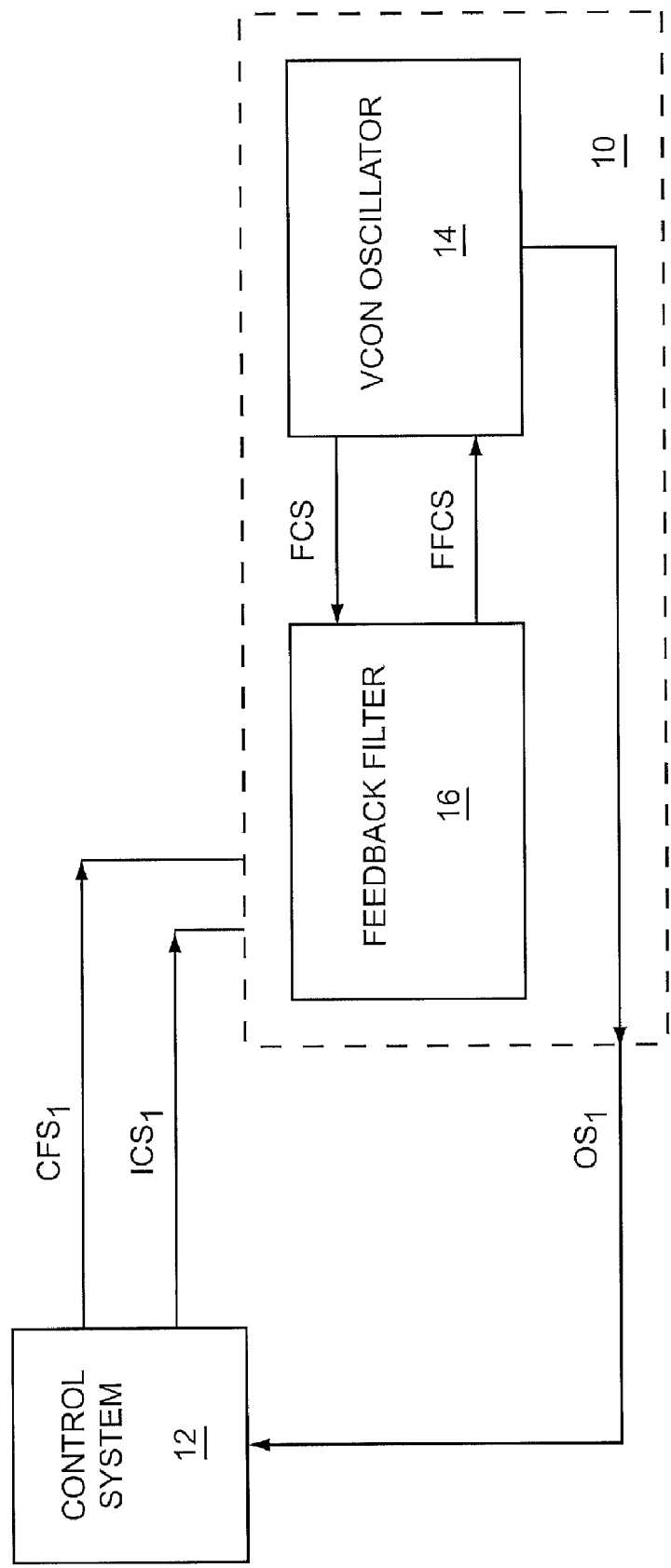
FIG. 2 shows one embodiment of the controllable oscillator block illustrated in FIG. 1.

FIG. 2 shows one embodiment of the first controllable oscillator block 10 illustrated in FIG. 1. A VCON oscillator 14 provides the first output signal $OS_1$ to the control system 12, and a frequency control signal FCS to a feedback filter 16. The first output signal $OS_1$ has a frequency based on a frequency of the VCON oscillator 14, which is based on the first initialization control signal $ICS_1$, the first common forcing signal $CFS_1$, or both. The frequency control signal FCS is based on the frequency of the VCON oscillator 14. The feedback filter 16 filters the frequency control signal FCS to provide a filtered frequency control signal FFCS to the VCON oscillator 14. The feedback filter 16 may include a low pass filter, a band pass filter, or other type of filter. The feedback filter 16 may have a feedback filter transfer function H(s), which is a function of frequency and may be equal to a magnitude and phase of the filtered frequency control signal FFCS divided by a magnitude and phase of the frequency control signal FCS.

Figure 3:
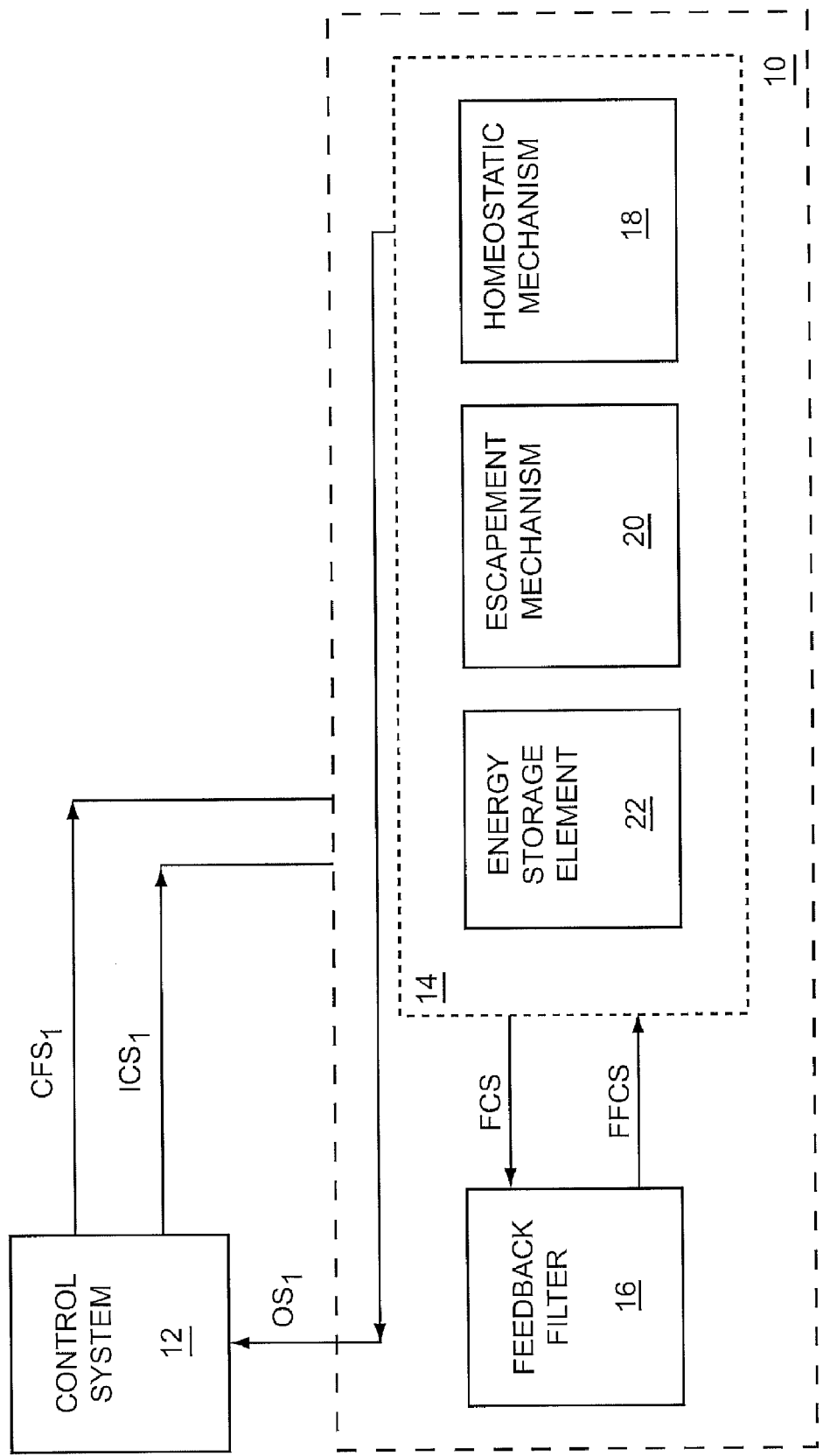
FIG. 3 shows details of the voltage controlled oscillator neuron (VCON) oscillator illustrated in FIG. 2.

FIG. 3 shows details of the VCON oscillator 14 illustrated in FIG. 2. The VCON oscillator 14 mimics certain behaviors in a brain by combining a homeostatic mechanism 18, an escapement mechanism 20, and an energy storage element 22. The homeostatic mechanism 18 is a mechanism that can achieve or maintain equilibrium, or stability, by means of adjustments. A voltage controlled oscillator (VCO) is an example of a homeostatic mechanism 18. A VCO can maintain a stable output frequency by adjusting its input voltage. The escapement mechanism 20 is a mechanism that can be used to provide feedback to regulate a system. A classic mechanical example is an escapement gear in a pendulum clock. The escapement gear controls extraction of energy from a mainspring, weights, etc. to the pendulum at the proper point in the swing of the pendulum, thereby maintaining oscillation at the proper frequency. An electrical circuit having a positive resistance region and a negative resistance region can serve as an escapement mechanism by providing basins of attraction formed by coupling the escapement mechanism 20 with other circuitry, such as the homeostatic mechanism 18 and the energy storage element 22. The escapement mechanism 20 may have at least one positive resistance region, at least one negative resistance region, or both. A tunnel diode is an example of an escapement mechanism having a positive resistance region and a negative resistance region. A resistor is an example of an escapement mechanism having only a positive resistance region.

Figure 4:
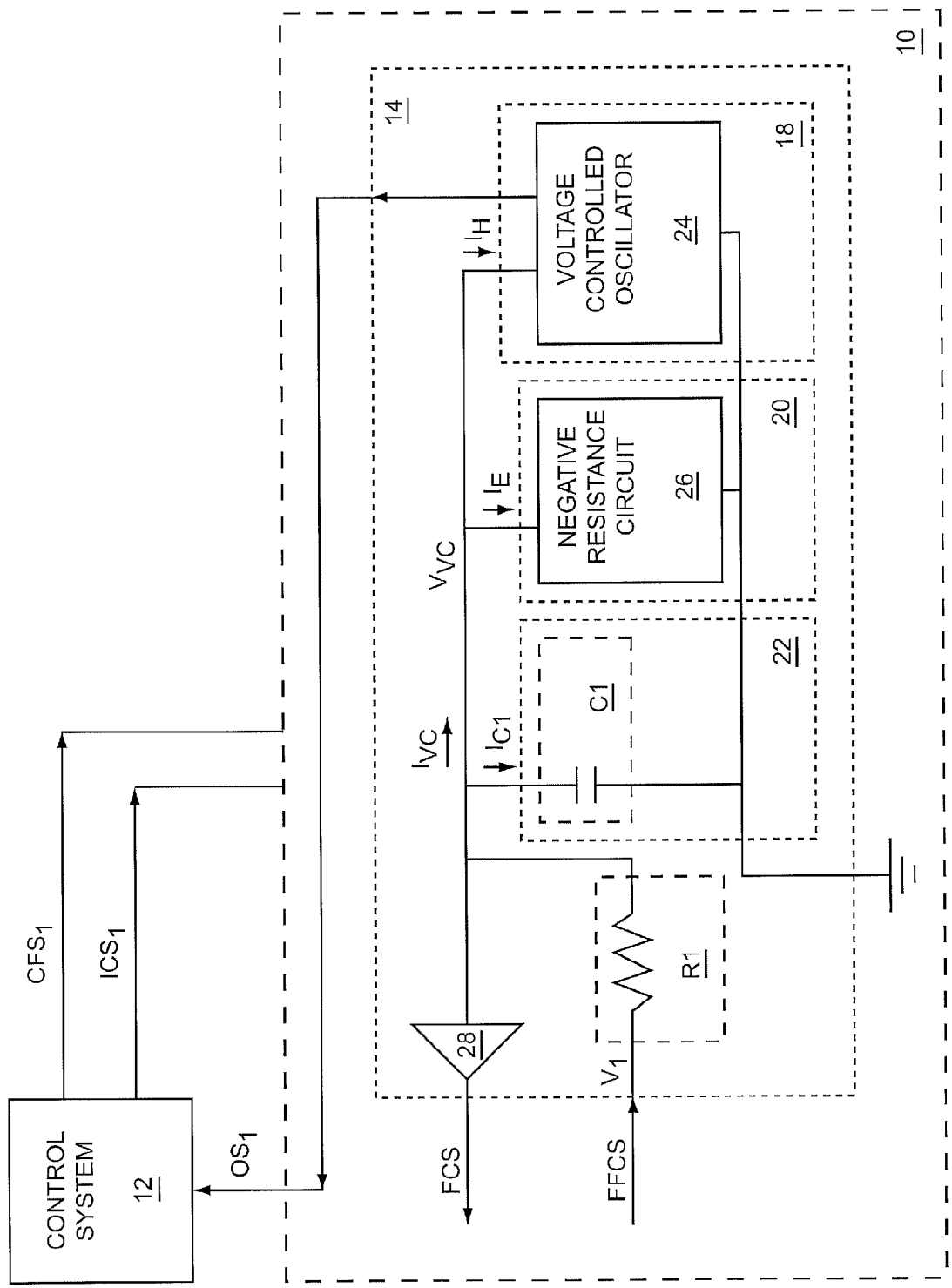
FIG. 4 shows additional details of the VCON oscillator illustrated in FIG. 3.

FIG. 4 shows additional details of the VCON oscillator 14 illustrated in FIG. 3. The homeostatic mechanism 18 includes a VCO 24, which is coupled between a first resistive element R1 and ground, and provides the first output signal $OS_1$ to the control system 12. The escapement mechanism 20 includes a negative resistance circuit 26, which is coupled between the first resistive element R1 and ground. The energy storage element 22 includes a first capacitive element C1, which is coupled between the first resistive element R1 and ground. The filtered frequency control signal FFCS provides a first voltage $V_1$ to the first resistive element R1, which provides a VCON current $I_{VC}$ and a VCON voltage $V_{VC}$ to the VCO 24, the negative resistance circuit 26, and the first capacitive element C1. The VCON current $I_{VC}$ is divided into a homeostatic current $I_H$, an escapement current $I_E$, and a first capacitive current $I_{C1}$. The VCON voltage $V_{VC}$ is buffered by a unity gain buffer 28, which provides the frequency control signal FCS. The input to the unity gain buffer 28 may conduct very little current; therefore, the current through the first resistive element R1 may be approximately equal to the VCON current $I_{VC}$.

The VCON oscillator 14 is an oscillator that may be motivated by the principles of neuroscience and may be generally described by the differential equation described below:

$$\tau(d^2\theta/dt^2)+F(d\theta/dt,p)+A(r)\sin\theta=\omega, \qquad \text{EQ. 1}$$

where $d\theta/dt$ may represent an instantaneous frequency of the homeostatic mechanism 18 and may correlate with voltage when the VCO 24 is used as the homeostatic mechanism 18. Since $d\theta/dt$ is a function of time, $d\theta/dt=d\theta(t)$. All of the terms of EQ. 1 are expressed in terms of an angle per unit time, which may be radians/second.

$\tau$ may represent a time constant associated with the VCON oscillator 14 and may be represented by EQ. 2 in the VCON oscillator 14 illustrated in FIG. 4.

$$\tau=(R1)(C1). \qquad \text{EQ. 2}$$

$F(d\theta/dt, p)$ may represent the behavior of the escapement mechanism 20, which may have an "N" shaped relationship between voltage and current, thereby having a negative resistance region when the negative resistance circuit 26 is used as the escapement mechanism 20.

p may be a constant, multiple constants, a vector of constants, trigonometric polynomials, stochastic processes, or representative of other functions of time, such as reference signals or parametric forcing signals.

$A(r)\sin\theta$ may represent the behavior of the homeostatic mechanism 18 and may relate voltage to current when the VCO 24 is used as the homeostatic mechanism 18, and the amplitude A is a function of r, which may be a constant, multiple constants, a vector of constants, trigonometric polynomials, stochastic processes, or representative of other functions of time, such as reference signals or parametric forcing signals. $\sin\theta$ may be replaced by any odd periodic function of $\theta$.

$\omega$ may be a constant, multiple constants, a vector of constants, trigonometric polynomials, stochastic processes, or of other functions of time, and may be indicative of a feedback signal.

The VCON oscillator 14 illustrated in FIG. 4 may be specifically described by Kirchhoff's current law and Ohm's law as shown in EQ. 3 and EQ. 4, respectively:

$$I_{VC}=I_{C1}+I_E+I_H. \qquad \text{EQ. 3}$$

$$I_{VC}=(V_I-V_{VC})/R1. \qquad \text{EQ. 4}$$

Since $I=C\,dV/dt$ and letting $V_{VC}=V$ and $dV_{VC}/dt=dV/dt$, then $$I_{C1}=(C1)dV_{VC}/dt=(C1)dV/dt. \qquad \text{EQ. 5}$$

The negative resistance circuit 26 may have an "N" shaped relationship between voltage and current, and is described by EQ. 6:

$$I_E=f(V,p). \qquad \text{EQ. 6}$$

The VCO 24 provides the first output signal $OS_1$, which has a frequency that is proportional to its input voltage, which is the VCON voltage $V_{VC}$. The homeostatic current $I_H$ that is provided to the VCO 24 may have a component that is proportional to the frequency of the first output signal $OS_1$; therefore, the VCO 24 may be described by EQ. 7:

$$I_H = \alpha(r)\sin\left(\gamma\int_0^t V(t')\,dt'\right)+K, \qquad \text{EQ. 7}$$

where $\alpha$ is the amplitude of the homeostatic current $I_H$, $\gamma$ is a proportionality constant, and K is a direct current (DC) component of the homeostatic current $I_H$. Since $$\int_0^t V(t')\,dt'$$

exists within a periodic function, it can be represented as an number angle variable as shown in EQ. 8:

$$\theta=\theta(t)=\left(\gamma\int_0^t V(t')\,dt'\right). \qquad \text{EQ. 8}$$

The variable t' is used to represent time inside of the integral. EQ. 9 is obtained by differentiating both sides of EQ. 8:

$$d\theta/dt=\gamma V. \qquad \text{EQ. 9}$$

EQ. 9 illustrates that the frequency of the VCO 24 is proportional to the voltage applied to the VCO 24. This relationship of a frequency, or frequencies, resulting from a controlling parameter, or parameters, is an important aspect of the present invention. Alternate embodiments of the present invention may use different frequency generating mechanisms, such as current controlled oscillators, quantum mechanical entities, such as Josephson junctions, nano-technology devices, rotating devices, such as generators, which may include nano-technology devices and larger, micro-electro-mechanical systems (MEMS) devices, and various phase-locked loop circuits.

EQ. 10 is obtained by differentiating both sides of EQ. 9:

$$d^2\theta/dt^2=\gamma/(dV/dt). \qquad \text{EQ. 10}$$

EQ. 11 is obtained by substituting EQ. 8 into EQ. 7:

$$I_H=\alpha(r)\sin\theta+K. \qquad \text{EQ. 11}$$

EQ. 12 is obtained by subtracting EQ. 4 from EQ. 3 and substituting V for $V_{VC}$:

$$0=I_{C1}+I_E+I_H-(V_I-V)/R1. \qquad \text{EQ. 12}$$

EQ. 13 is obtained by re-arranging EQ. 12:

$$V_I=(R1)I_{C1}+(R1)I_E+(R1)I_H+V. \qquad \text{EQ. 13}$$

EQ. 14 is obtained by substituting EQ. 5, EQ. 6, EQ. 9, and EQ. 11 into EQ. 13:

$$V_I=(R1)(C1)(dV/dt)+(R1)f(V,p)+(R1)(K+\alpha(r)\sin\theta)+(d\theta/dt)/\gamma. \qquad \text{EQ. 14}$$

EQ. 15 is obtained by substituting EQ. 2 and EQ. 10 into EQ. 14 and multiplying by $\gamma$:

$$\gamma V_I=\gamma\tau(d^2\theta/dt^2)/\gamma+\gamma(R1)f(V,p)+d\theta/dt+\gamma(R1)(K+\alpha(r)\sin\theta). \qquad \text{EQ. 15}$$

Since $d\theta/dt$ is a function of V, F $(d\theta/dt, p)$ may be a function of $f(V,p)$ and $d\theta/dt$ as shown in EQ. 16:

$$F(d\delta/dt,p)=\gamma(R1)f(V,p)+d\theta/dt. \quad \text{EQ. 16}$$

EQ. 17 is obtained by substituting EQ. 16 into EQ. 15 and simplifying:

$$\gamma V_I=\tau(d^2\theta/dt^2)+F(d\theta/dt,p)+\gamma(R1)(K+\alpha(r)\sin\theta). \quad \text{EQ. 17}$$

EQ. 18 is obtained by letting $\omega=\gamma V_I-\gamma(R1)(K)$ and $A(r)=\gamma(R1)\alpha(r)$:

$$\omega=\tau(d^2\delta/dt^2)+F(d\theta/dt,p)+A(r)\sin\theta. \quad \text{EQ. 18}$$

EQ. 18 is equivalent to EQ. 1 and shows that the VCON oscillator 14 illustrated in FIG. 4 is specifically described by the differential equation shown in EQ. 17 and generally described by the differential equation shown in EQ. 18. After a period of time for stabilization, the output frequencies $\rho$ from the VCO 24 are represented by EQ. 19:

$$\rho=\lim_{t\to\infty}\frac{\theta(t)}{2\pi t}. \quad \text{EQ. 19}$$

EQ. 20 is obtained by substituting EQ. 8 into EQ. 19:

$$\rho=\lim_{t\to\infty}\frac{\theta(t)}{2\pi t}=\frac{1}{2\pi}\gamma\lim_{t\to\infty}\frac{1}{t}\left(\int_0^t V(t')dt'\right). \quad \text{EQ. 20}$$

The $$\lim_{t\to\infty}\frac{1}{t}\left(\int_0^t V(t')dt'\right)$$

portion of EQ. 20 represents the average of V (t) over time, which is denoted by <V>, as shown in EQ. 21:

$$\rho=\frac{1}{2\pi}\gamma<V>. \quad \text{EQ. 21}$$

EQ. 21 indicates that after stabilization, the output frequencies $\rho$ are proportional to the average VCO 24 voltage <V>, which is expected behavior for a VCO 24. If the VCO 24 voltage V (t) stabilizes to a single value, then the output frequencies $\rho$ will be a single output frequency.

Figure 5:
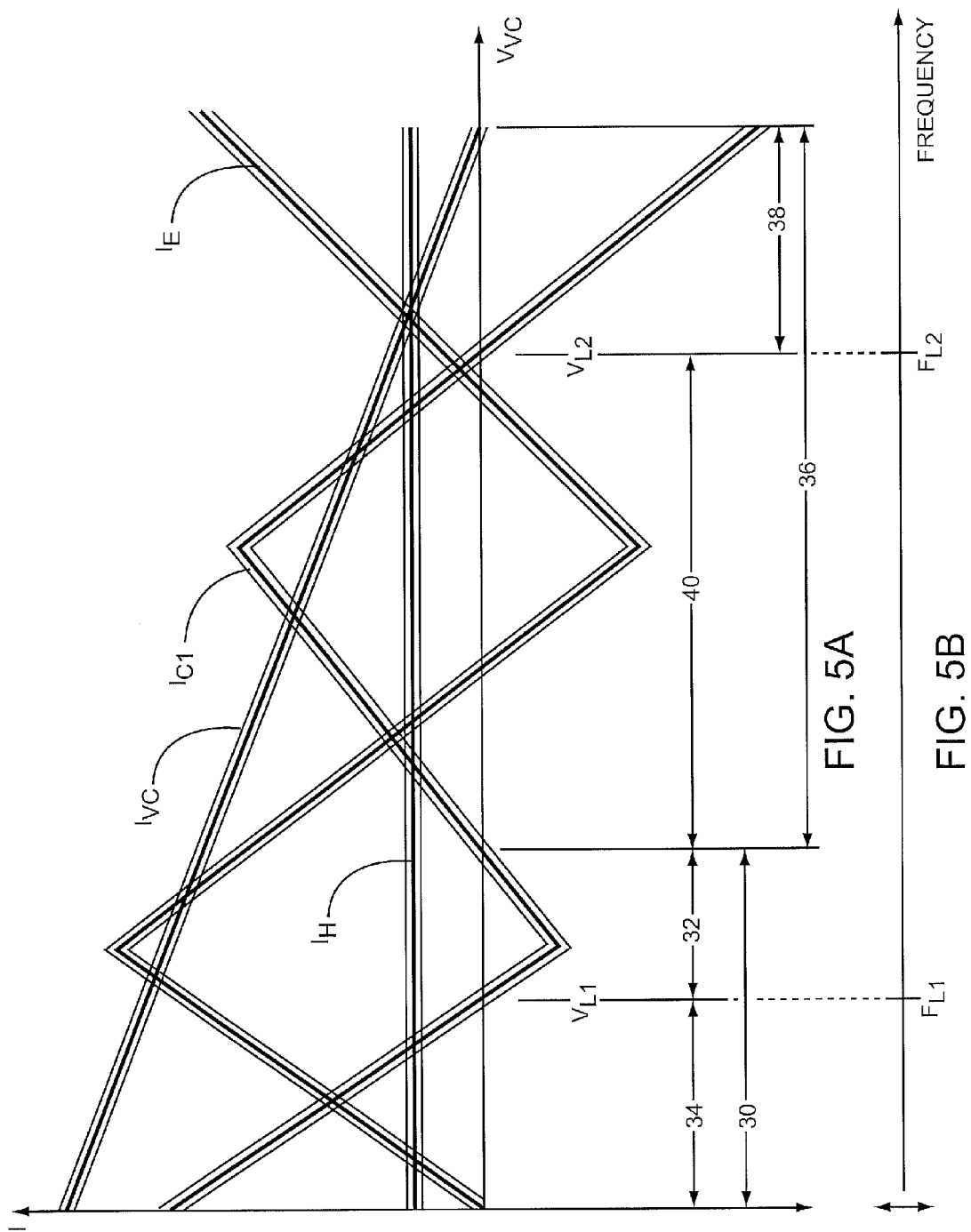
FIGS. 5A and 5B are graphs showing the relationships between voltages, currents, and frequencies in the VCON oscillator illustrated in FIG. 4.

FIG. 5A is a graph showing the relationships between voltages and currents in the VCON oscillator 14 illustrated in FIG. 4. The triple lines shown in FIG. 5A indicate the mean and amplitude of oscillating quantities. Specifically, the VCON current $I_{VC}$, the homeostatic current $I_H$, the escapement current $I_E$, and the first capacitive current $I_{C1}$ are plotted versus the VCON voltage $V_{VC}$, according to an exemplary embodiment of the present invention. According to EQ. 11, the homeostatic current $I_H$ has a DC component (K) for all values of the VCON voltage $V_{VC}$, and an alternating current (AC) component ($\alpha(r)\sin\theta$). The DC component is shown as a horizontal line and the AC component is shown as the thickness of the line. Since the homeostatic current $I_H$ has an AC component, the other currents $I_{VC}$, $I_E$, and $I_{C1}$ will also have AC components, and their corresponding voltages will have AC components. All of these AC components are represented as line thicknesses. FIG. 5A is not drawn to scale, and other embodiments of the present invention may have larger AC components relative to their DC components. The slopes of the lines in FIG. 5A ignore AC components resulting from the AC component of the homeostatic current $I_H$.

The VCON current $I_{VC}$ is based on the voltage across the first resistive element R1 and is represented by EQ. 4. If the first voltage $V_1$ is held constant, the VCON current $I_{VC}$ is equal to zero when the VCON voltage $V_{VC}$ is equal to the first voltage $V_1$, and is equal to the first voltage $V_1$ divided by the resistance of the first resistive element R1 when the VCON voltage $V_{VC}$ is equal to zero. The escapement current $I_E$ is based on current-voltage (IV) characteristics of the negative resistance circuit 26, which may have both positive resistance and negative resistance operating regions. The first capacitive current $I_{C1}$ is described by EQ. 5.

A first basin of attraction 30, which may also be described as a first lock range, is determined by the first capacitive current $I_{C1}$. If the voltage across the first capacitive element C1, which is the VCON voltage $V_{VC}$, falls within the first basin of attraction 30 and the first capacitive current $I_{C1}$ is negative, as illustrated by a first negative current range 32, and since I=C dv/dt, the voltage across the first capacitive element C1, which is the VCON voltage $V_{VC}$, decreases. Likewise, if the voltage across the first capacitive element C1 falls within the first basin of attraction 30 and the first capacitive current $I_{C1}$ is positive, as illustrated by a first positive current range 34, and since I=C dV/dt, the voltage across the first capacitive element C1, which is the VCON voltage $V_{VC}$, increases, which tends to stabilize the VCON voltage $V_{VC}$ at a first lock voltage $V_{L1}$. Similarly, if the voltage across the first capacitive element C1 falls within a second basin of attraction 36 and the first capacitive current $I_{C1}$ is negative, as illustrated by a second negative current range 38, the voltage across the first capacitive element C1 decreases. Likewise, if the voltage across the first capacitive element C1 falls within the second basin of attraction 36 and the first capacitive current $I_{C1}$ is positive, as illustrated by a second positive current range 40, the voltage across the first capacitive element C1 increases, which tends to stabilize the VCON voltage $V_{VC}$ at a second lock voltage $V_{L2}$.

FIG. 5B is a graph showing the relationships between lock voltages and lock frequencies in the VCON oscillator 14 illustrated in FIG. 4. Since the frequency of the VCO 24 is determined by the VCON voltage $V_{VC}$, the lock voltages $V_{L1}$, $V_{L2}$ have corresponding lock frequencies $F_{L1}$, $F_{L2}$ that appear in the first output signal $OS_1$. The initial values of the first voltage $V_1$ and the VCON voltage $V_{VC}$ may be provided by the first initialization control signal $ICS_1$ and may determine which basin of attraction 30, 36 is used.

Figure 6:
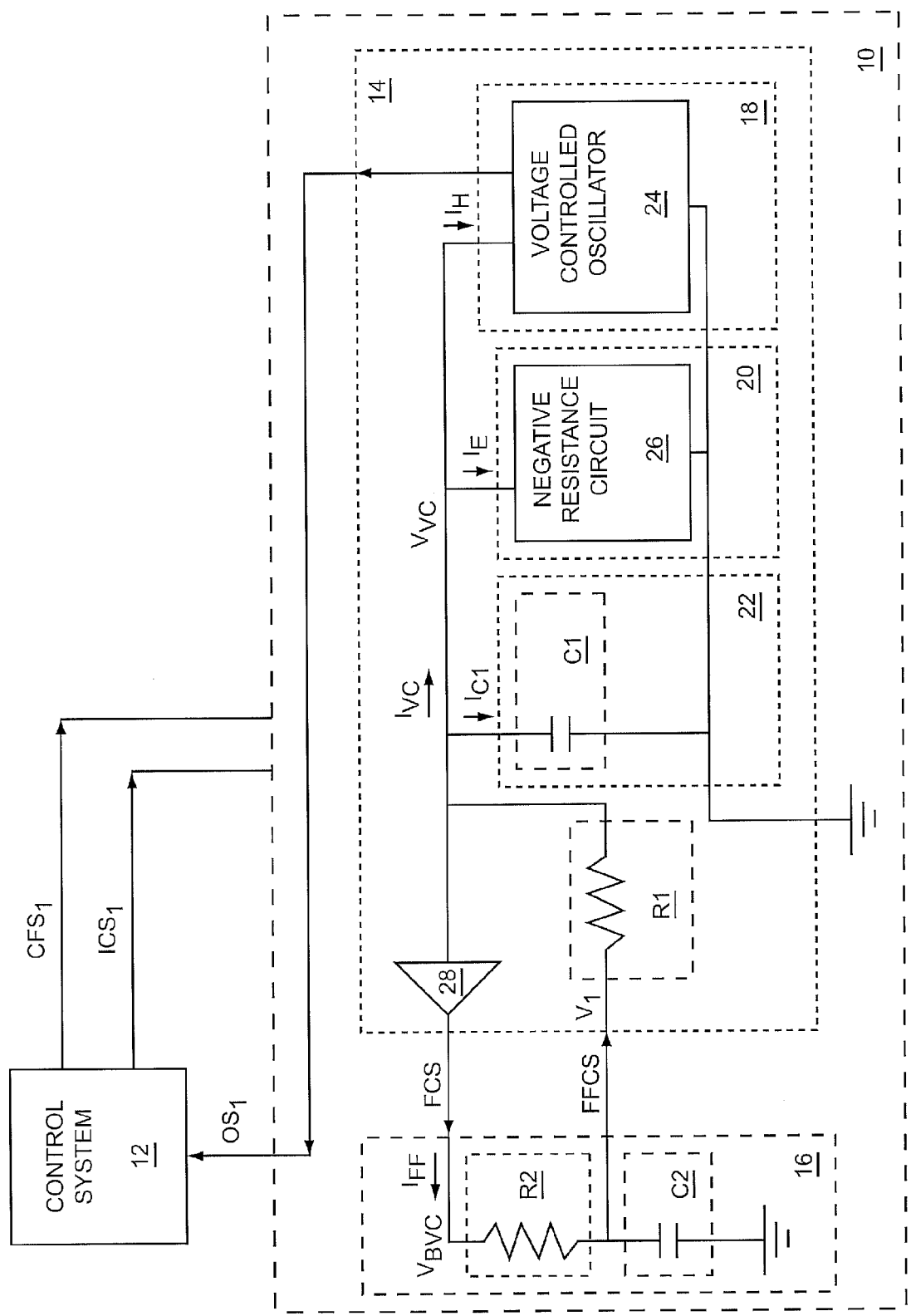
FIG. 6 shows details of the VCON oscillator and feedback filter illustrated in FIG. 2.

FIG. 6 shows details of the VCON oscillator 14 and feedback filter 16 illustrated in FIG. 2. The feedback filter 16 includes a second capacitive element C2 coupled to ground and a second resistive element R2 coupled to the second capacitive element C2 to form a low pass filter. The frequency control signal FCS provides a buffered VCON voltage $V_{BVC}$ and a feedback filter current $I_{FF}$ to the second resistive element R2. The second resistive and capacitive elements R2, C2 provide the filtered frequency control signal FFCS. An unloaded feedback filter transfer function H(s) of the feedback filter 16 is equal to the first voltage $V_1$ without a load divided by the buffered VCON voltage $V_{BVC}$ as shown in EQ. 22:

$$H(s)=V_1/V_{BVC}. \qquad \text{EQ. 22}$$

The second resistive element R2 and the second capacitive element C2 form a complex voltage divider as show in EQ. 23:

$$V_1 = V_{BVC} \frac{1/(j\omega C2)}{(1/(j\omega C2)) + R2}. \qquad \text{EQ. 23}$$

EQ. 24 is obtained by multiplying by $$\frac{(j\omega C2)}{(j\omega C2)}.$$

$$V_1 = V_{BVC} \frac{(j\omega C2)/(j\omega C2)}{((j\omega C2)/(j\omega C2)) + (j\omega C2 R2)}. \qquad \text{EQ. 24}$$

EQ. 25 is obtained by substituting EQ. 22 into EQ. 24 and simplifying:

$$H(s) = V_1/V_{BVC} = \frac{1}{1+(j\omega C2 R2)}. \qquad \text{EQ. 25}$$

If s=jω, and (C2)(R2)=$\tau_1$, then EQ. 26 is obtained by substituting into EQ. 25:

$$H(s)=1/(1+s\tau_1). \qquad \text{EQ. 26}$$

However, the first resistive element R1 presents a load to the feedback filter 16. Therefore, it may be desirable to determine a loaded feedback filter transfer function H(s), which is equal to the first voltage $V_1$ with a load divided by the buffered VCON voltage $V_{BVC}$. Since the unity gain buffer 28 has a voltage gain of approximately one, the buffered VCON voltage $V_{BVC}$ is approximately equal to the VCON voltage $V_{VC}$; therefore, the first resistive element R1 and the second resistive element R2 behave as if they were coupled in parallel. So, if R2 is replaced with a replacement resistive element RR, such that RR=(R2)(R1)/(R2+R1), and if $\tau_2$=(C2)(RR), then EQ. 27 is obtained:

$$H(s)=1/(1+s\tau_2). \qquad \text{EQ. 27}$$

The feedback filter transfer function H(s) shown in EQ. 27 is a low pass filter transfer function; therefore, over time, frequencies in the VCON voltage $V_{VC}$ that are above a break frequency of the feedback filter transfer function H(s) would tend to be filtered out as time moves forward. Thus, the addition of the feedback filter 16 to the VCON oscillator 14 modifies the response, after stabilization, of the VCON oscillator 14 by the effects of the feedback filter 16, as represented by the feedback filter transfer function H(s). Specifically, EQ. 20 shows the output frequencies ρ from the VCON oscillator 14 without the feedback filter 16, and EQ. 20 reduces to EQ. 21; however, with the addition of the feedback filter 16, EQ. 21 is modified by the feedback filter transfer function H(s) as shown in EQ. 28. It is important to note that averaging V (t) as shown in EQ. 20 and filtering it with a low pass filter having a low enough break frequency as shown in EQ. 28 gives approximately the same result, which is the constant part of the Fourier expansion of V (t):

$$\rho = \lim_{t\to\infty} \frac{1}{2\pi t}\left(\gamma \int_0^t V(t')\,dt'\right) \approx \frac{1}{2\pi}\gamma H(s)V(t). \qquad \text{EQ. 28}$$

It may helpful to realize that the first voltage $V_1$ is related to the VCON voltage $V_{VC}$ by a factor of the feedback filter transfer function H(s) as shown in EQ. 29:

$$\frac{1}{2\pi}\gamma H(s)V(t) = \frac{1}{2\pi}\gamma <V_1>. \qquad \text{EQ. 29}$$

Alternate embodiments of the present invention may use a feedback filter 16 having a feedback filter transfer function H(s) of any graphical shape or mathematical equation. The homeostatic mechanism 18 may include any type of device or circuit that produces at least one frequency that can be controlled. The escapement mechanism 20 may include any type of device or circuit that can provide a stabilization feedback mechanism. The escapement mechanism 20 may include any number of positive resistance regions, negative resistance regions, or both. A voltage versus current graph of the escapement mechanism 20 may include curves of any shape, including straight lines. The energy storage element 22 may include any number of separate energy storage elements, such as at least one capacitive element, at least one inductive element, or both.

Figure 7:
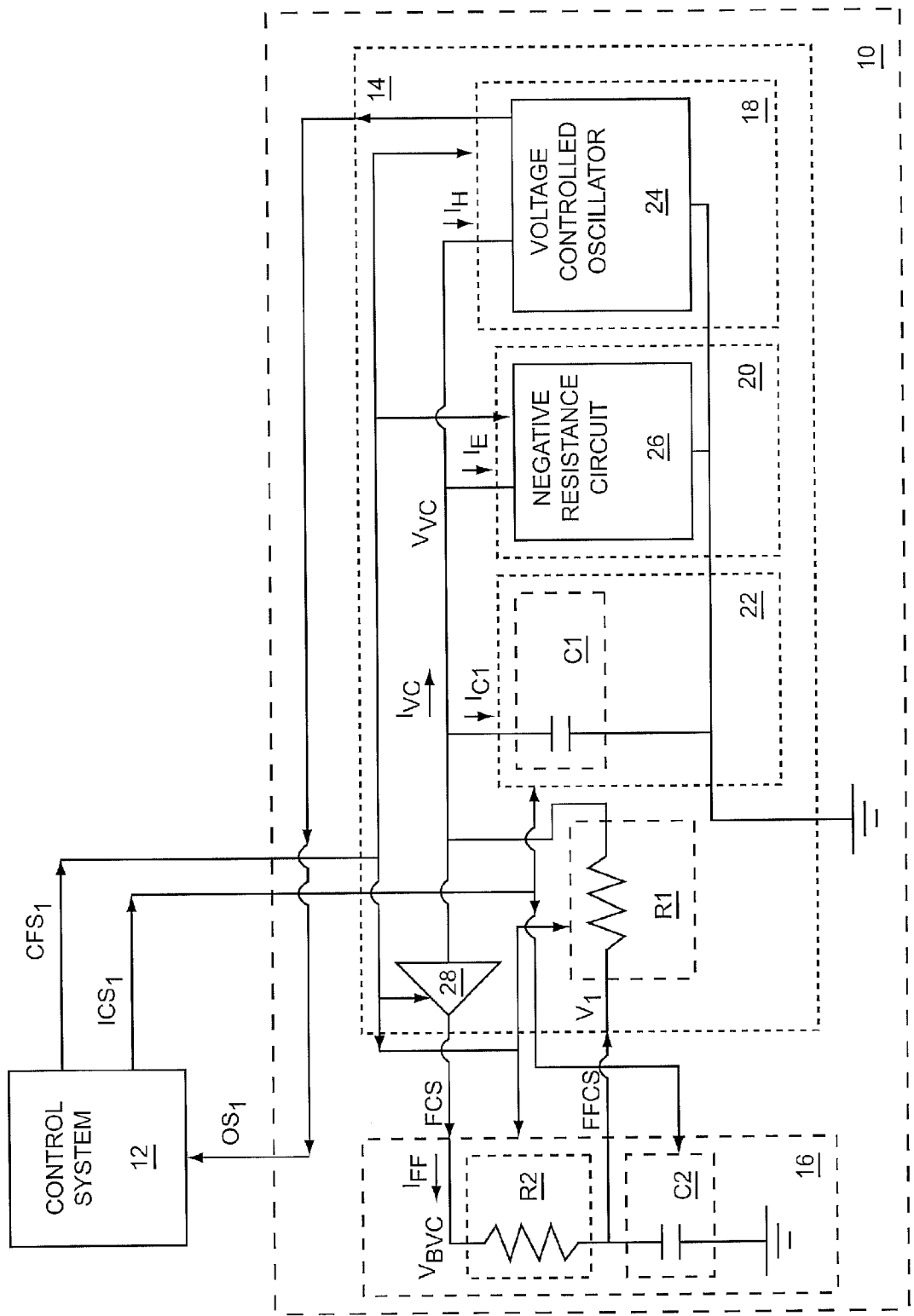
FIG. 7 shows details of the first common forcing signal and the first initialization control signal illustrated in FIG. 6.

FIG. 7 shows details of the first common forcing signal $CFS_1$ and the first initialization control signal $ICS_1$ illustrated in FIG. 6. The first common forcing signal $CFS_1$ may be used to modify parameters of the homeostatic mechanism 18, the escapement mechanism 20, the feedback filter 16, the buffer 28, the first resistive element R1, or any combination thereof. The first initialization control signal $ICS_1$ may be used to establish initial conditions before or coincident with the start of a stimulation, such as the voltages across the first capacitive element C1, the second capacitive element C2, or both.

Figure 8:
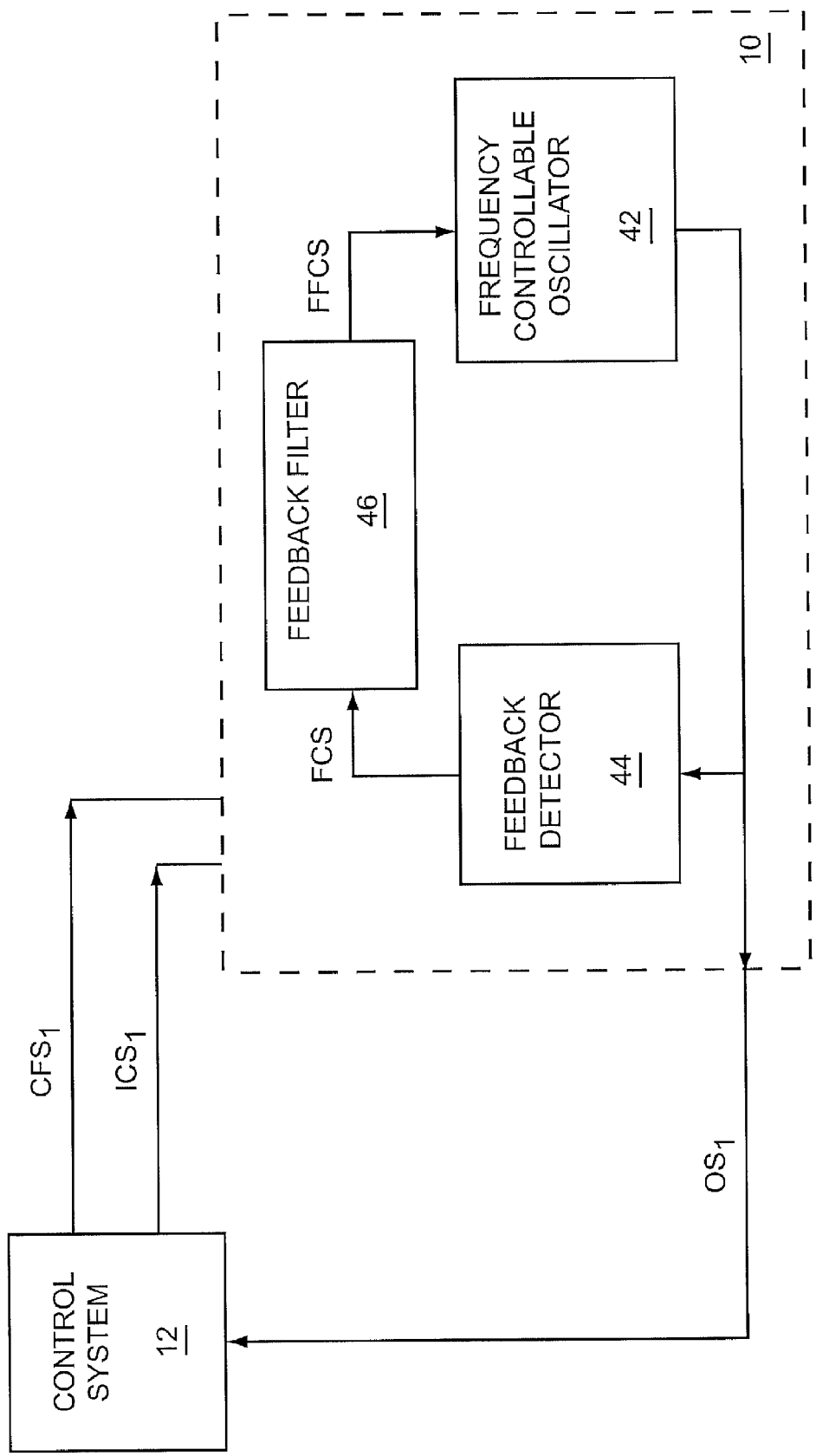
FIG. 8 shows an alternate embodiment of the controllable oscillator block illustrated in FIG. 1.

FIG. 8 shows an alternate embodiment of the first controllable oscillator block 10 illustrated in FIG. 1. A frequency controllable oscillator 42 provides the first output signal $OS_1$ to the control system 12 and to a feedback detector 44. The first output signal $OS_1$ has a frequency based on a frequency of the frequency controllable oscillator 42, which is based on the first initialization control signal $ICS_1$, the first common forcing signal $CFS_1$, or both. The feedback detector 44 creates a frequency control signal FCS based on a frequency error of the first output signal $OS_1$. The frequency control signal FCS feeds a feedback filter 46, which filters the frequency control signal FCS to provide a filtered frequency control signal FFCS to the frequency controllable oscillator 42. The feedback filter 46 may include a low pass filter, a band pass filter, or other type of filter. The feedback filter 46 may have a feedback filter transfer function H(s), which is a function of frequency and may be equal to a magnitude and phase of the filtered frequency control signal FFCS divided by a magnitude and phase of the frequency control signal FCS.

Figure 9:
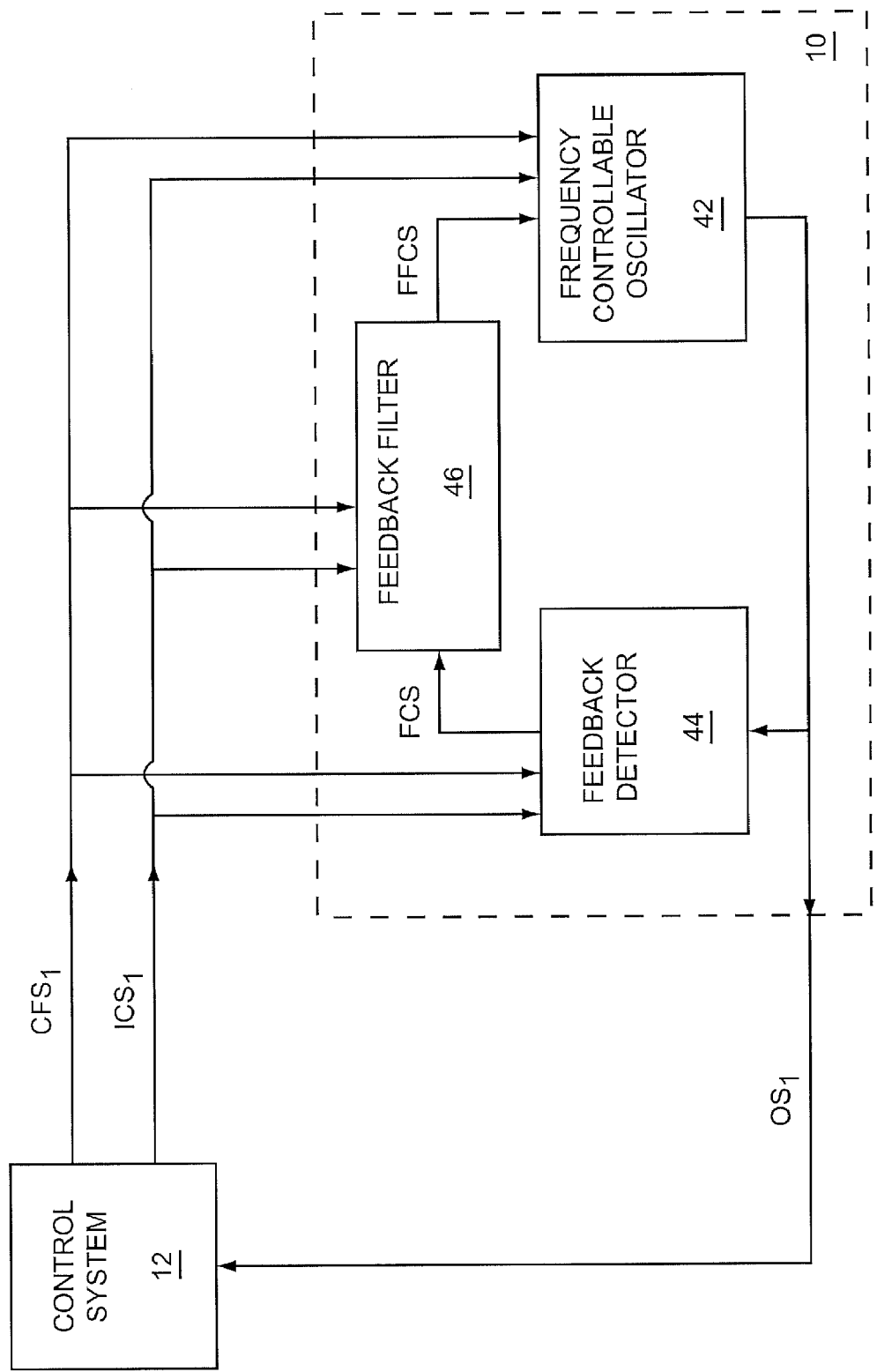
FIG. 9 shows details of the first common forcing signal and the first initialization control signal illustrated in FIG. 8.

FIG. 9 shows details of the first common forcing signal $CFS_1$ and the first initialization control signal $ICS_1$ illustrated in FIG. 8. The first common forcing signal $CFS_1$ may be used to modify parameters of the frequency controllable oscillator 42, the feedback detector 44, the feedback filter 46, or any combination thereof. The first initialization control signal $ICS_1$ may be used to establish initial conditions before or coincident with the start of a stimulation, such as initial voltages or currents in the frequency controllable oscillator 42, the feedback detector 44, the feedback filter 46, or any combination thereof.

Figure 10:
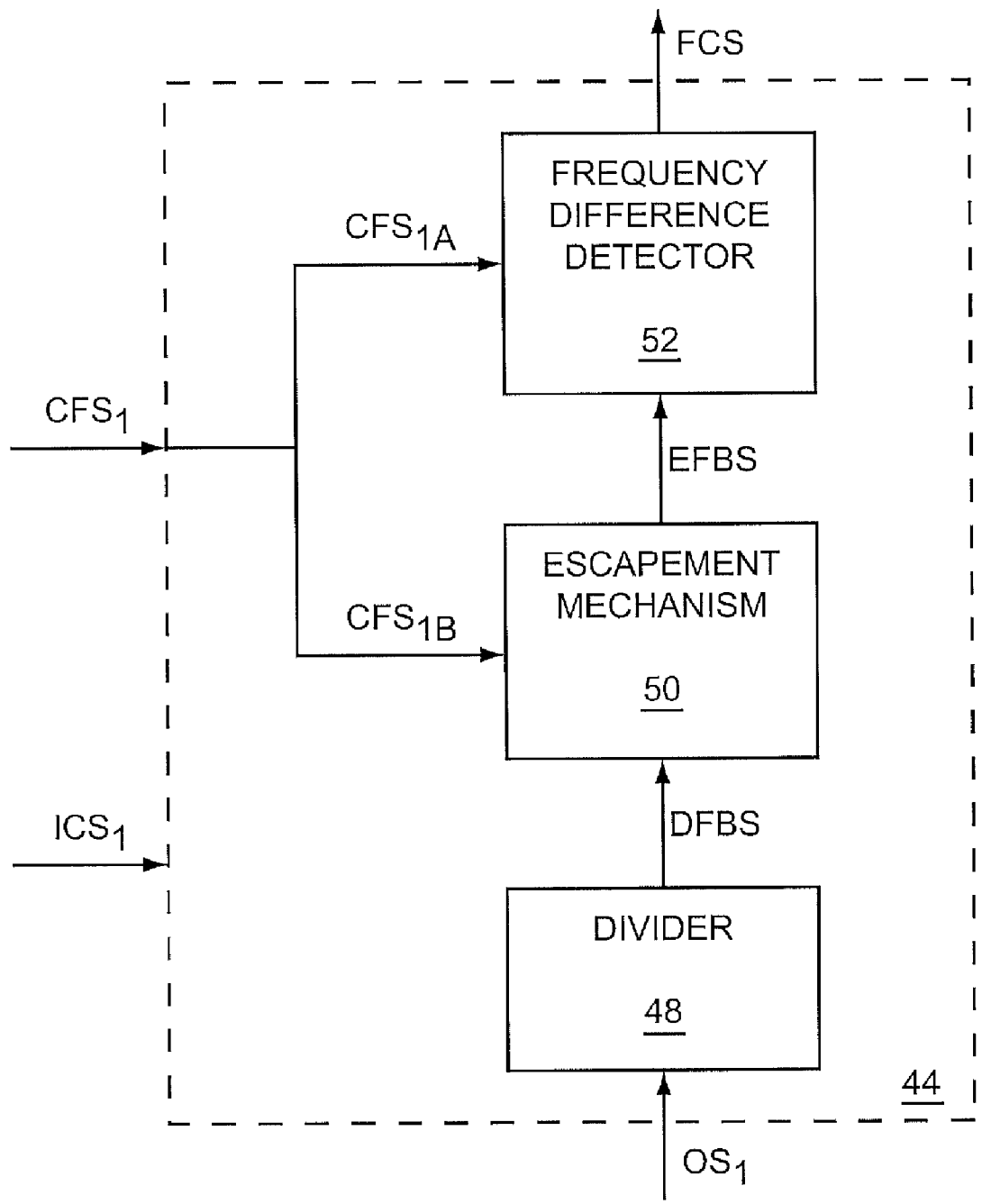
FIG. 10 shows details of the feedback detector illustrated in FIG. 9.

FIG. 10 shows details of the feedback detector 44 illustrated in FIG. 9. The first output signal $OS_1$ feeds a divider 48, which divides the first output signal $OS_1$ to a lower frequency to create a divided feedback signal DFBS that is fed into an escapement mechanism 50, which may enable multiple basins of attraction. The escapement mechanism 50 may have at least one positive resistance region, at least one negative resistance region, or both. The escapement mechanism 50 provides an escapement feedback signal EFBS to a frequency difference detector 52, which detects differences between any frequencies in the escapement feedback signal EFBS and any frequencies in a reference signal (not shown). The frequency difference detector 52 creates the frequency control signal FCS based on any frequency differences. The first common forcing signal $CFS_1$ may provide a first common forcing sub-signal $CFS_{1A}$, which may be used to modify parameters of the frequency difference detector 52, and a second common forcing sub-signal $CFS_{1B}$, which may be used to modify parameters of the escapement mechanism 50. Alternate embodiments of the present invention may include or omit the divider 48, the escapement mechanism 50, the frequency difference detector 52, or any combination coupled in any order.

Figure 11:
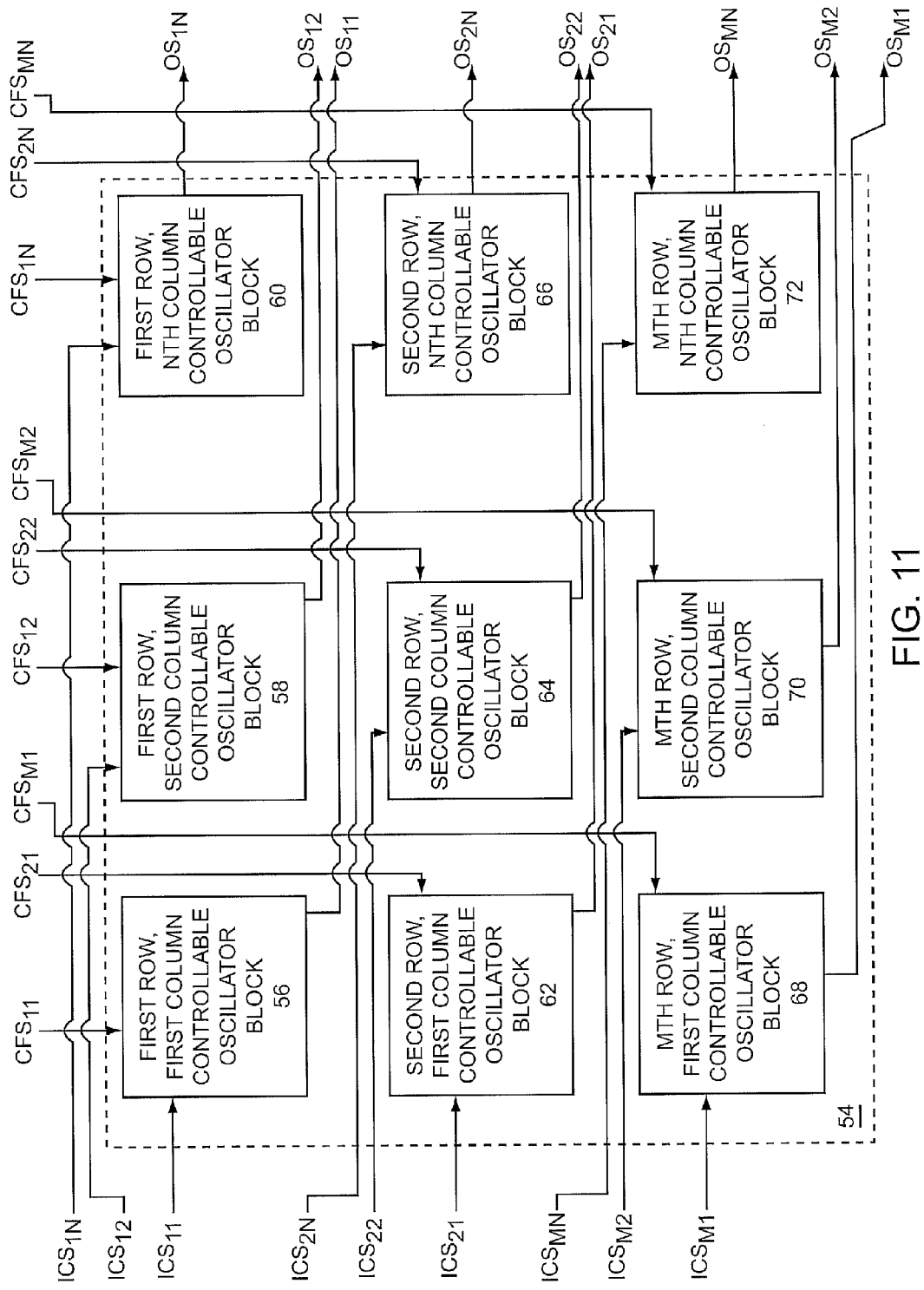
FIG. 11 shows an M by N controllable oscillator block array.

FIG. 11 shows an M by N controllable oscillator block array 54, which includes multiple controllable oscillator blocks. A first row, first column controllable oscillator block 56 receives a first row, first column common forcing signal $CFS_{11}$ and a first row, first column initialization control signal $ICS_{11}$, and provides a first row, first column output signal $OS_{11}$. A first row, second column controllable oscillator block 58 receives a first row, second column common forcing signal $CFS_{12}$ and a first row, second column initialization control signal $ICS_{12}$, and provides a first row, second column output signal $OS_{12}$. A first row, Nth column controllable oscillator block 60 receives a first row, Nth column common forcing signal $CFS_{1N}$ and a first row, Nth column initialization control signal $ICS_{1N}$, and provides a first row, Nth column output signal $OS_{1N}$. The controllable oscillator block array 54 may include additional or fewer first row controllable oscillator blocks, as needed.

A second row, first column controllable oscillator block 62 receives a second row, first column common forcing signal $CFS_{21}$ and a second row, first column initialization control signal $ICS_{21}$, and provides a second row, first column output signal $OS_{21}$. A second row, second column controllable oscillator block 64 receives a second row, second column common forcing signal $CFS_{22}$ and a second row, second column initialization control signal $ICS_{22}$, and provides a second row, second column output signal $OS_{22}$. A second row, Nth column controllable oscillator block 66 receives a second row, Nth column common forcing signal $CFS_{2N}$ and a second row, Nth column initialization control signal $ICS_{2N}$, and provides a second row, Nth column output signal $OS_{2N}$. The controllable oscillator block array 54 may include additional or fewer second row controllable oscillator blocks, as needed.

An Mth row, first column controllable oscillator block 68 receives an Mth row, first column common forcing signal $CFS_{M1}$ and an Mth row, first column initialization control signal $ICS_{M1}$, and provides an Mth row, first column output signal $OS_{M1}$. An Mth row, second column controllable oscillator block 70 receives an Mth row, second column common forcing signal $CFS_{M2}$ and an Mth row, second column initialization control signal $ICS_{M2}$, and provides an Mth row, second column output signal $OS_{M2}$. An Mth row, Nth column controllable oscillator block 72 receives an Mth row, Nth column common forcing signal $CFS_{MN}$ and an Mth row, Nth column initialization control signal $ICS_{MN}$, and provides an Mth row, Nth column output signal $OS_{MN}$. The controllable oscillator block array 54 may include additional or fewer rows of controllable oscillator blocks, as needed.

Figure 12:
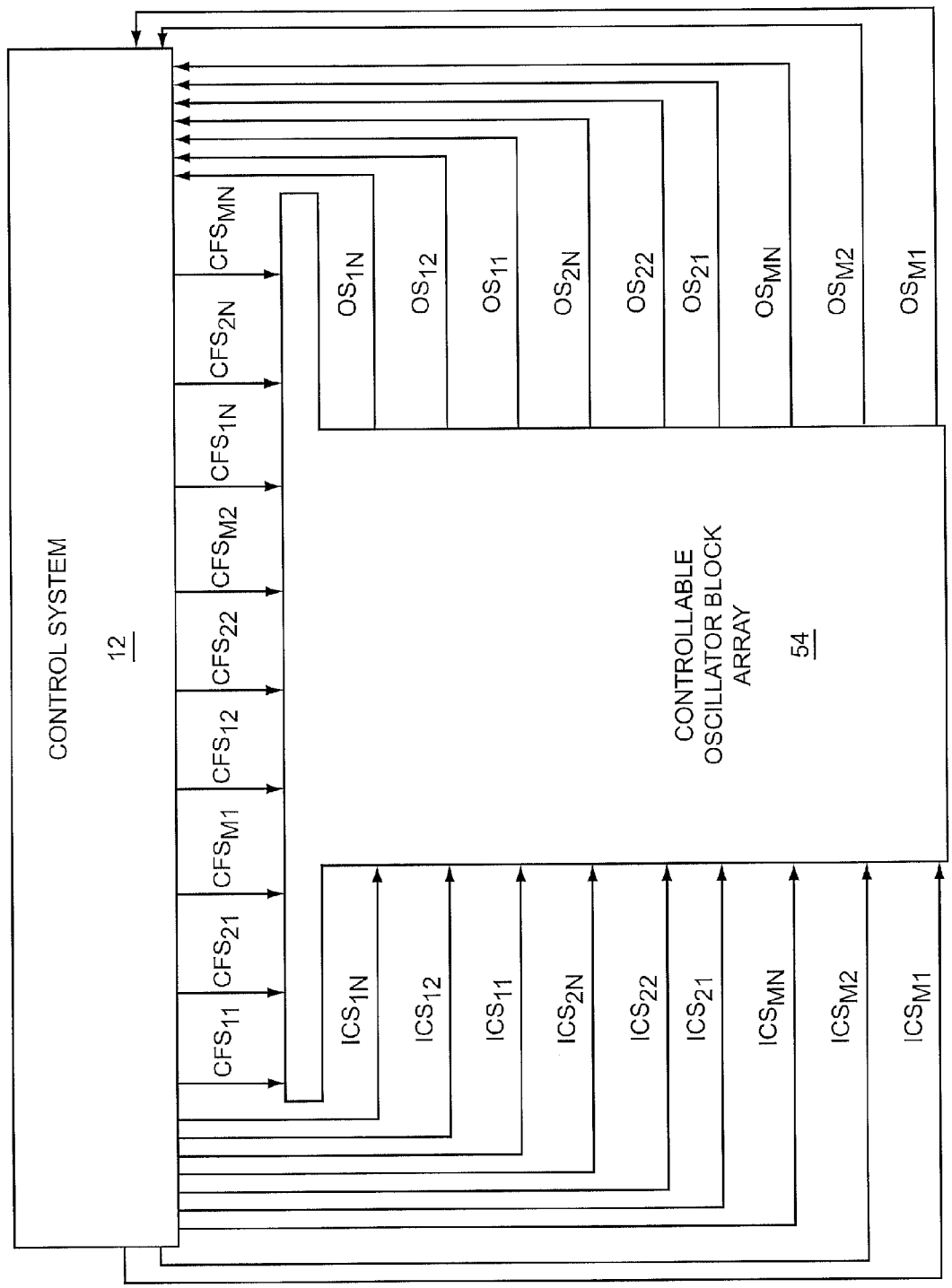
FIG. 12 shows the controllable oscillator block array coupled to the control system, which directly provides each array forcing signal, according to one embodiment of the present invention.

FIG. 12 shows the controllable oscillator block array 54 coupled to the control system 12, which provides the row and column initialization control signals $ICS_{11}$, $ICS_{12}$, $ICS_{1N}$, $ICS_{21}$, $ICS_{22}$, $ICS_{2N}$, $ICS_{M1}$, $ICS_{M2}$, $ICS_{MN}$ to their respective controllable oscillator blocks 56, 58, 60, 62, 64, 66, 68, 70, 72, and receives the row and column output signals $OS_{11}$, $OS_{12}$, $OS_{1N}$, $OS_{21}$, $OS_{22}$, $OS_{2N}$, $OS_{M1}$, $OS_{M2}$, $OS_{MN}$ from their respective controllable oscillator blocks 56, 58, 60, 62, 64, 66, 68, 70, 72. The control system 12 directly provides each of the row and column forcing signals $CFS_{11}$, $CFS_{12}$, $CFS_{1N}$, $CFS_{21}$, $CFS_{22}$, $CFS_{2N}$, $CFS_{M1}$, $CFS_{M2}$, $CFS_{MN}$ to their respective controllable oscillator blocks 56, 58, 60, 62, 64, 66, 68, 70, 72, according to one embodiment of the present invention. The control system 12 may provide additional or fewer row and column initialization control signals and additional or fewer row and column forcing signals, as needed. The control system 12 may receive additional or fewer row and column output signals, as needed. In one embodiment of the present invention, pulses from some of the row and column output signals $OS_{11}$, $OS_{12}$, $OS_{1N}$, $OS_{21}$, $OS_{22}$, $OS_{2N}$, $OS_{M1}$, $OS_{M2}$, $OS_{MN}$ may be coupled through the control system 12 to provide pulses to others of the controllable oscillator blocks 56, 58, 60, 62, 64, 66, 68, 70, 72 using the appropriate row and column forcing signals $CFS_{11}$, $CFS_{12}$, $CFS_{1N}$, $CFS_{21}$, $CFS_{22}$, $CFS_{2N}$, $CFS_{M1}$, $CFS_{M2}$, $CFS_{MN}$. The coupling through the control system 12 may include resistive coupling, inductive coupling, capacitive coupling, or any combination thereof. An event for an oscillator is any time its phase increases by $2\pi$. Such events from a controllable oscillator block, such as the first controllable oscillator block 10, may be carefully timed and used to trigger events in other controllable oscillator blocks. Arrays of multiple controllable oscillator blocks 56, 58, 60, 62, 64, 66, 68, 70, 72 in series, in parallel, or both, may be used to mimic certain dynamics of a brain, and may be used as computing elements in a quantum flux computer. Such computing elements are described in an article by Paul Bunyk et al., *RSFQ Technology: Physics and Devices*, Int. Journal on High Speed Electronics and Systems, vol. 11, No. 1, pp. 257-306 (2001), which is hereby incorporated by reference in its entirety.

Figure 13:
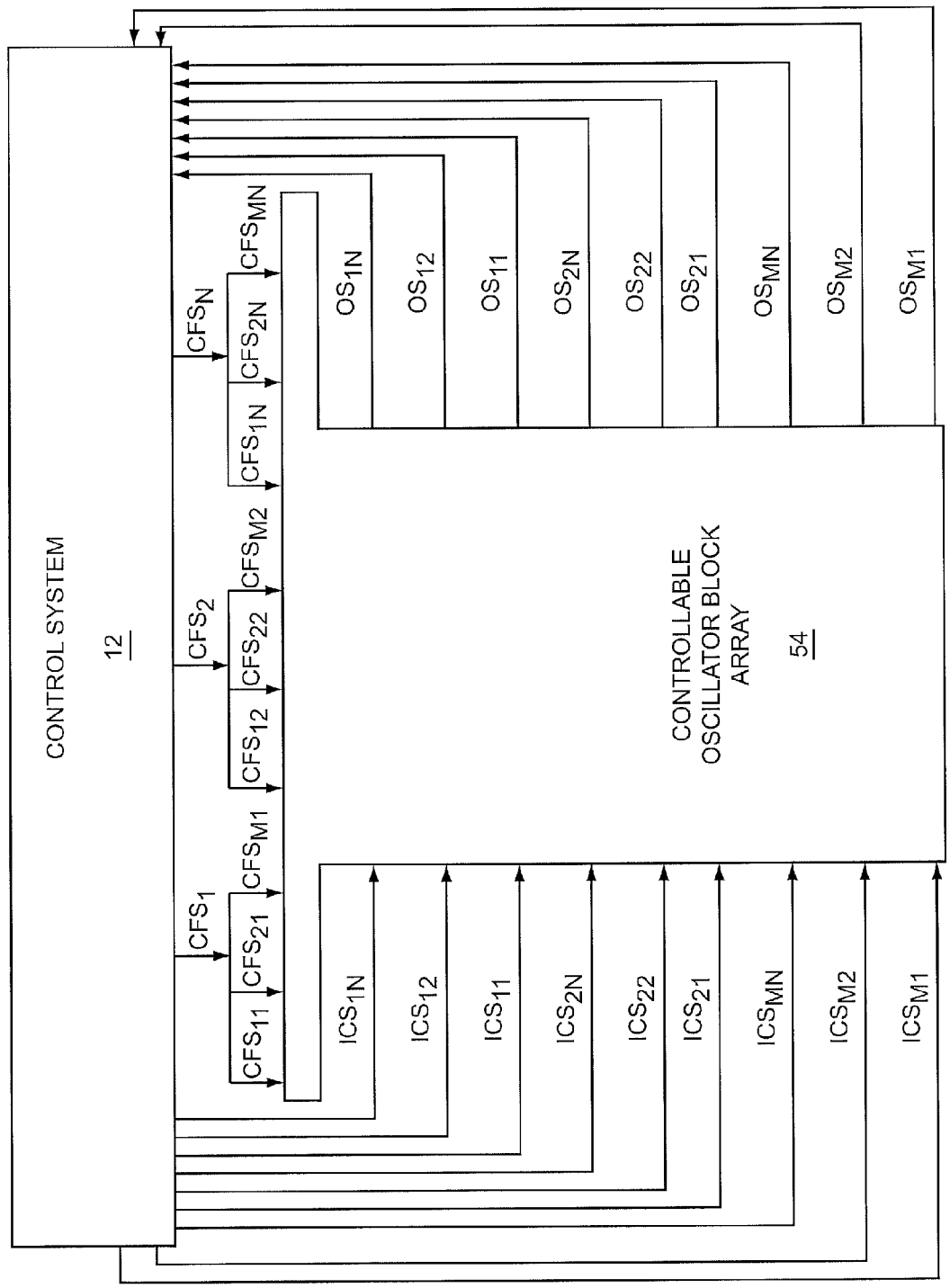
FIG. 13 shows the controllable oscillator block array coupled to the control system, which uses first, second, and third common forcing signals to provide the array forcing signals, according to an alternate embodiment of the present invention.

FIG. 13 shows the controllable oscillator block array 54 coupled to the control system 12, which uses first, second, and N common forcing signals $CFS_1$, $CFS_2$, $CFS_N$ to provide the row and column forcing signals $CFS_{11}$, $CFS_{12}$, $CFS_{1N}$, $CFS_{21}$, $CFS_{22}$, $CFS_{2N}$, $CFS_{M1}$, $CFS_{M2}$, $CFS_{MN}$, according to an alternate embodiment of the present invention. The first common forcing signal $CFS_1$ provides the first column forcing signals $CFS_{11}$, $CFS_{21}$, $CFS_{M1}$, the second common forcing signal $CFS_2$ provides the second column forcing signals $CFS_{12}$, $CFS_{22}$, $CFS_{M2}$, and the N common forcing signal $CFS_N$ provides the Nth column forcing signals $CFS_{1N}$, $CFS_{2N}$, $CFS_{MN}$. The control system 12 may provide additional or fewer row and column initialization control signals, may receive additional or fewer row and column output signals, and may provide additional or fewer common forcing signals, as needed. The common forcing signals may provide additional or fewer row and column forcing signals, as needed. Each common forcing signal may be assigned to any number, combination, or both, of the row and column forcing signals. Timing of stimulations initiated by any of the row and column initialization control signals $ICS_{11}$, $ICS_{12}$, $ICS_{1N}$, $ICS_{21}$, $ICS_{22}$, $ICS_{2N}$, $ICS_{M1}$, $ICS_{M2}$, $ICS_{MN}$, by any of the first, second, and N common forcing signals $CFS_1$, $CFS_2$, $CFS_N$, or both, may be in any order, synchronized with each other, independent of each other, or any combination thereof.

Stimulations of the first column of the controllable oscillator block array 54 initiated by any of the first column initialization control signals $ICS_{11}$, $ICS_{21}$, $ICS_{M1}$, by the first common forcing signal $CFS_1$, or both, may produce stimulation results provided by the first column output signals $OS_{11}$, $OS_{21}$, $OS_{M1}$, which may provide information used to create second column initialization control signals $ICS_{12}$, $ICS_{22}$, $ICS_{M2}$, the second common forcing signal $CFS_2$, or both, to initiate stimulations of the second column of the controllable oscillator block array 54. Similarly, stimulation results provided by the second column output signals $OS_{12}$, $OS_{22}$, $OS_{M2}$ may provide information used to create subsequent column initialization control signals. Generally, stimulation results may be used to provide subsequent stimulations using the same controller oscillator blocks used to create the stimulation results, using other controller oscillator blocks, or both. Stimulation results may be combined with previous stimulation results in any manner to provide subsequent stimulations using any combination of controllable oscillator blocks.

Figure 14:
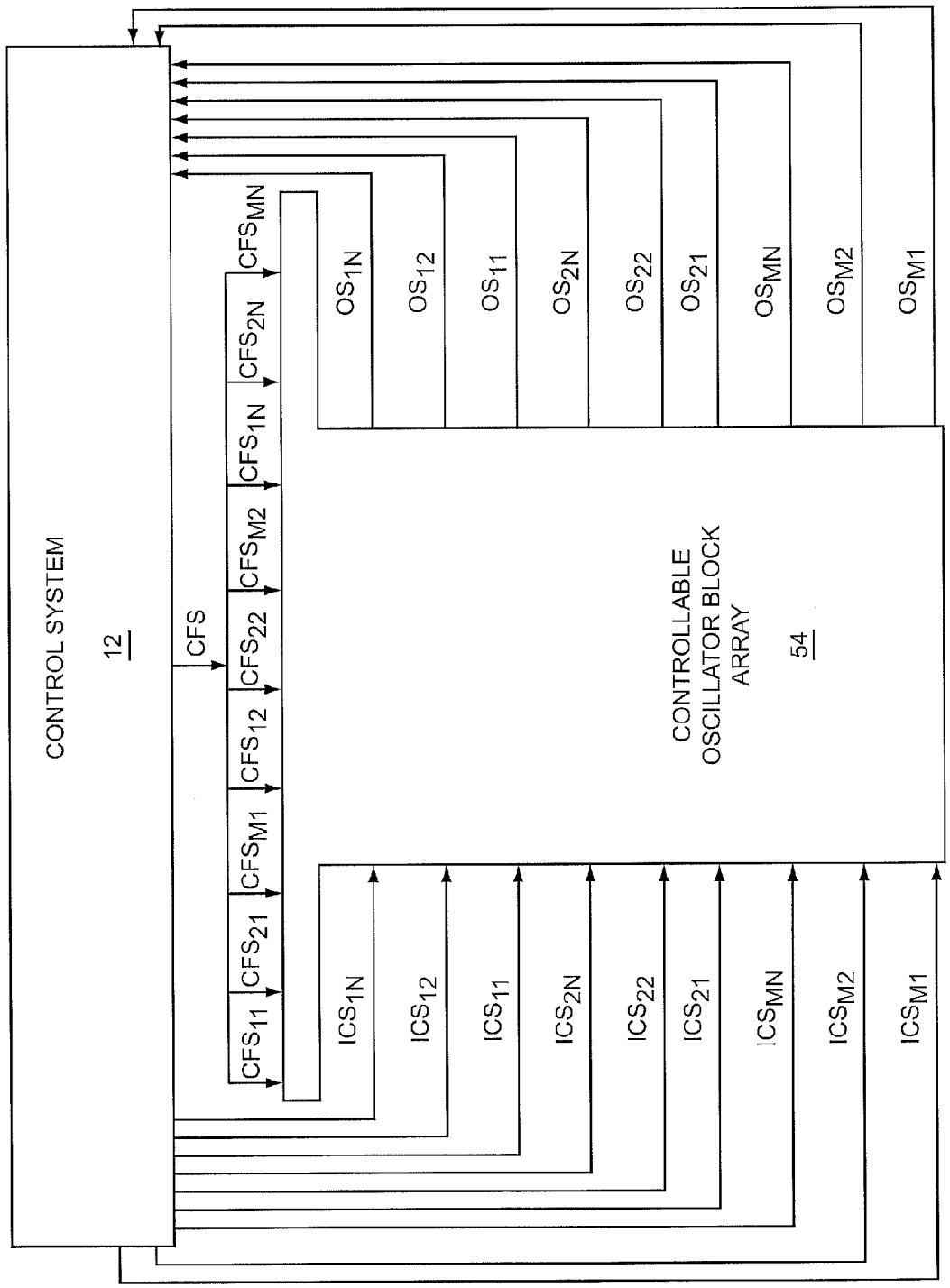
FIG. 14 shows the controllable oscillator block array coupled to the control system, which uses the first common forcing signal to provide the array forcing signals, according to an additional embodiment of the present invention.

FIG. 14 shows the controllable oscillator block array 54 coupled to the control system 12, which uses an aggregated common forcing signal CFS to provide the row and column forcing signals $CFS_{11}$, $CFS_{12}$, $CFS_{1N}$, $CFS_{21}$, $CFS_{22}$, $CFS_{2N}$, $CFS_{M1}$, $CFS_{M2}$, $CFS_{MN}$, according to an additional embodiment of the present invention. The control system 12 may provide additional or fewer row and column initialization control signals and may receive additional or fewer row and column output signals. The aggregated common forcing signal CFS may provide additional or fewer row and column forcing signals, as needed.

Forcing signals may have power spectrums with dominant frequencies, which may correlate with basins of attraction in controllable oscillator blocks; therefore, the dominant frequencies may produce stable states in the controllable oscillator blocks. As previously discussed, each stable state has its own lock frequency, which is approached as the stabilization time increases. When initial conditions are combined with the forcing signals, the basins of attraction may partition the initial conditions to correlate with the stable states. Different forcing signals may partition the initial conditions differently; therefore, there is an association between the initial conditions and forcing signals, and the output frequencies associated with the stable states. This association is an associative memory and may be useful in reproducing brain-like behaviors, such as pattern recognition.

In an exemplary embodiment of the present invention, the M by N controllable oscillator block array 54 has eight rows and eight columns of controllable oscillator blocks to create a 64-block controllable oscillator block array 54. Each controllable oscillator block is illustrated in FIG. 6, is driven with the aggregated common forcing signal CFS as illustrated in FIG. 14, and is driven with its corresponding row and column initialization control signal $ICS_{11}$, $ICS_{12}$, $ICS_{1N}$, $ICS_{21}$, $ICS_{22}$, $ICS_{2N}$, $ICS_{M1}$, $ICS_{M2}$, $ICS_{MN}$. The aggregated common forcing signal CFS is used to vary the amplitude of the homeostatic current $I_H$ as shown in EQ. 30:

$$CFS = r(t) = A(r). \qquad \text{EQ. 30}$$

If $\gamma=1$ and $K=0$, then $\omega = V_I(t)$. If $\tau=1$, then EQ. 31 is obtained by substituting Eq. 30, $\omega$, and $\tau$ into EQ. 18:

$$V_I(t) = (d^2\theta/dt^2) + F(d\theta/dt, p) + r(t)\sin\theta. \qquad \text{EQ. 31}$$

Each row and column initialization control signal $ICS_{11}$, $ICS_{12}$, $ICS_{1N}$, $ICS_{21}$, $ICS_{22}$, $ICS_{2N}$, $ICS_{M1}$, $ICS_{M2}$, $ICS_{MN}$ for each of the 64 controllable oscillator blocks is used to establish each first voltage $V_1$ before the start of a stimulation, which is expressed mathematically as $V_1(0)$. $V_1$ is the voltage across the second capacitive element C2.

In a series of four pattern recognition examples, the 64 controllable oscillator blocks are used as a matching element in a pattern recognition system. A pattern of values of $V_1(0)$ are shown in Table 1 for all 64 controllable oscillator blocks. The letter "F" is spelled out using "4s" at the left side of the array, and the letter "I" is spelled out using "8s" at the right side of the array. All 64 controllable oscillator blocks receive the same aggregated common forcing signal CFS. If a frequency $\Omega_1$ of the aggregated common forcing signal CFS is within a basin of attraction of the controllable oscillator block, and if a value of $V_1(0)$ falls within the basin of attraction, then $V_1$ and its corresponding frequency $\rho$ will stabilize close to $\Omega_1$. Likewise, if a value of $V_1(0)$ falls outside the basin of attraction, then $V_1$ and its corresponding frequency $\rho$ will usually not stabilize close to $\Omega_1$. Tables 2, 4, 6, and 8 were created by multiplying each entry of Table 1 with a different matrix of standard Gaussian random variables.

TABLE 1

| 4 | 4 | 4 | 4 | 4 | 0 | 0 | 0 |
|---|---|---|---|---|---|---|---|
| 4 | 4 | 0 | 4 | 4 | 0 | 0 | 0 |
| 4 | 4 | 0 | 0 | 0 | 0 | 8 | 8 |
| 4 | 4 | 4 | 4 | 4 | 0 | 8 | 8 |
| 4 | 4 | 4 | 4 | 4 | 0 | 8 | 8 |
| 4 | 4 | 0 | 0 | 0 | 0 | 8 | 8 |
| 4 | 4 | 0 | 0 | 0 | 0 | 8 | 8 |
| 4 | 4 | 0 | 0 | 0 | 0 | 0 | 0 |

In the first example, Table 2 contains the values of $V_1(0)$ for all 64 controllable oscillator blocks, $r(t)=1+30\cos 2\pi\Omega_2 t=1+30\cos 16\pi t$; therefore, $\Omega_2=8$, which corresponds with $V_1=8$. Table 3 contains the values of $V_1(75)$ for all 64 controllable oscillator blocks, which is enough time for $V_1$ to stabilize. The controllable oscillator blocks having an "8" in Table 1 stabilized to "8," and the remaining controllable oscillator blocks did not stabilize to any specific value.

TABLE 2

| 4.4657 | 3.4039 | 3.6536 | 4.3222 | 4.3849 | 0.0750 | 0.1803 | 0.3133 |
|---|---|---|---|---|---|---|---|
| 4.0818 | 3.9542 | 0.0336 | 3.8448 | 4.8758 | 0.3979 | 0.5492 | 0.1624 |
| 5.4769 | 4.2728 | 0.6863 | 0.1613 | 0.0389 | 0.0712 | 8.3422 | 8.1192 |
| 4.6704 | 3.8732 | 3.7447 | 4.1617 | 3.3898 | 0.2464 | 8.4161 | 7.9604 |
| 3.8947 | 4.5283 | 4.4949 | 3.0378 | 2.8937 | 0.3292 | 7.3592 | 7.6841 |
| 3.3919 | 4.0159 | 0.4057 | 0.7304 | 0.2786 | 0.7081 | 8.3014 | 8.5784 |
| 4.3468 | 4.0157 | 0.0755 | 0.2007 | 0.6560 | 0.0493 | 8.3206 | 8.1029 |
| 3.7186 | 3.9052 | 0.2183 | 0.0611 | 0.2686 | 0.4758 | 0.0621 | 0.3401 |

TABLE 3

| 4.420 | 3.356 | 3.604 | 4.274 | 4.339 | 0.000 | 0.151 | 0.295 |
|---|---|---|---|---|---|---|---|
| 4.032 | 3.905 | 0.000 | 3.796 | 4.841 | 0.380 | 0.535 | 0.126 |
| 5.480 | 4.225 | 0.671 | 0.127 | 0.000 | 0.000 | 8.000 | 8.000 |
| 4.628 | 3.824 | 3.694 | 4.112 | 3.342 | 0.226 | 8.000 | 8.000 |
| 3.844 | 4.484 | 4.449 | 2.993 | 2.849 | 0.310 | 8.000 | 8.000 |
| 3.343 | 3.966 | 0.390 | 0.714 | 0.257 | 0.692 | 8.000 | 8.000 |
| 4.299 | 3.965 | 0.000 | 0.171 | 0.641 | 0.000 | 8.000 | 8.000 |
| 3.668 | 3.855 | 0.196 | 0.000 | 0.248 | 0.459 | 0.000 | 0.322 |

In the second example, Table 4 contains the values of $V_1(0)$ for all 64 controllable oscillator blocks, $r(t)=1+30\cos 2\pi\Omega_1 t=1+30\cos 8\pi t$; therefore, $\Omega_1=4$, which corresponds with $V_1=4$. Table 5 contains the values of $V_1(75)$ for all 64 controllable oscillator blocks, which is enough time for $V_1$ to stabilize. The controllable oscillator blocks having a "4" in Table 1 stabilized to "4," and the remaining controllable oscillator blocks did not stabilize to any specific value.

TABLE 4

| 4.2064 | 3.8381 | 4.0767 | 4.0650 | 4.4365 | 0.3604 | 0.0735 | 0.0152 |
|---|---|---|---|---|---|---|---|
| 3.9269 | 3.1192 | 0.4683 | 3.3593 | 3.4440 | 0.2056 | 0.4153 | 0.6125 |
| 4.8153 | 3.9814 | 0.4627 | 0.6119 | 0.6552 | 0.3644 | 9.0196 | 7.8788 |
| 4.5724 | 4.1974 | 3.5118 | 4.3210 | 3.8687 | 0.1329 | 7.6827 | 7.5092 |
| 3.3001 | 3.8334 | 3.7188 | 4.4112 | 3.9877 | 0.1777 | 7.2806 | 8.5315 |
| 4.3231 | 4.4101 | 0.1847 | 0.3080 | 0.1582 | 0.0796 | 7.3861 | 8.3224 |
| 4.3479 | 3.7516 | 0.1866 | 0.4840 | 0.1901 | 0.7039 | 8.3463 | 9.0136 |
| 4.1096 | 4.6284 | 0.4922 | 0.3416 | 0.4168 | 0.4201 | 0.5621 | 0.9334 |

TABLE 5

| 4.00 | 4.00 | 4.00 | 4.00 | 4.00 | 0.35 | 0.00 | 0.00 |
|---|---|---|---|---|---|---|---|
| 4.00 | 4.00 | 0.47 | 4.00 | 4.00 | 0.15 | 0.41 | 0.62 |
| 4.00 | 4.00 | 0.46 | 0.62 | 0.67 | 0.35 | 8.83 | 7.69 |
| 4.00 | 4.00 | 4.00 | 4.00 | 4.00 | 0.00 | 7.50 | 7.32 |
| 4.00 | 4.00 | 4.00 | 4.00 | 4.00 | 0.09 | 7.08 | 8.35 |
| 4.00 | 4.00 | 0.11 | 0.28 | 0.01 | 0.00 | 7.19 | 8.14 |
| 4.00 | 4.00 | 0.11 | 0.48 | 0.13 | 0.72 | 8.16 | 8.82 |
| 4.00 | 4.00 | 0.49 | 0.33 | 0.41 | 0.41 | 0.57 | 0.96 |

In the third example, Table 6 contains the values of $V_1(0)$ for all 64 controllable oscillator blocks, $r(t)=1+30\cos 2\pi\Omega_1 t+30\cos 2\pi\Omega_2 t=1+30\cos 8\pi t+30\cos 16\pi t$; therefore, $\Omega_1=4$, which corresponds with $V_1=4$, and $\Omega_2=8$, which corresponds with $V_1=8$. Table 7 contains the values of $V_1(75)$ for all 64 controllable oscillator blocks, which is enough time for $V_1$ to stabilize. The controllable oscillator blocks having a "4" in Table 1 stabilized to "4," the controllable oscillator blocks having an "8" in Table 1 stabilized to "8," and the remaining controllable oscillator blocks did not stabilize to any specific value.

TABLE 6

| | | | | | | | |
|---|---|---|---|---|---|---|---|
| 3.4624 | 3.1845 | 3.9873 | 3.1526 | 4.4149 | 0.5043 | 0.1787 | 0.6132 |
| 3.7539 | 3.6628 | 0.2747 | 3.8809 | 3.8740 | 0.7220 | 0.0519 | 0.0137 |
| 3.2994 | 3.7238 | 0.2320 | 0.3910 | 0.2738 | 0.7676 | 8.5036 | 8.6021 |
| 5.0944 | 4.2788 | 4.1473 | 3.6345 | 3.8706 | 0.6624 | 7.7748 | 8.4268 |
| 4.1178 | 3.9974 | 3.9090 | 3.4047 | 3.8536 | 0.5756 | 7.8057 | 8.2385 |
| 4.6717 | 4.1466 | 0.0404 | 1.0812 | 0.3024 | 0.4537 | 7.4369 | 7.5122 |
| 3.7586 | 3.8252 | 0.6449 | 0.2609 | 0.4910 | 0.0474 | 8.4140 | 7.2109 |
| 4.1046 | 3.8922 | 0.3457 | 0.5860 | 0.4052 | 0.2524 | 0.7086 | 0.1584 |

TABLE 7

| | | | | | | | |
|---|---|---|---|---|---|---|---|
| 4.00 | 3.99 | 4.00 | 3.98 | 4.00 | 0.49 | 0.15 | 0.60 |
| 4.00 | 4.00 | 0.26 | 4.00 | 4.00 | 0.71 | 0.00 | 0.00 |
| 4.00 | 4.00 | 0.21 | 0.38 | 0.25 | 0.76 | 8.00 | 8.00 |
| 4.17 | 4.00 | 4.00 | 4.00 | 4.00 | 0.65 | 8.00 | 8.00 |
| 4.00 | 4.00 | 4.00 | 4.00 | 4.00 | 0.57 | 8.00 | 8.00 |
| 4.00 | 4.00 | 0.00 | 1.07 | 0.28 | 0.44 | 8.00 | 8.00 |
| 4.00 | 4.00 | 0.64 | 0.24 | 0.48 | 0.00 | 8.00 | 7.97 |
| 4.00 | 4.00 | 0.33 | 0.58 | 0.39 | 0.23 | 0.70 | 0.13 |

In the fourth example, Table 8 contains the values of $V_1(0)$ for all 64 controllable oscillator blocks, $r(t)=1+30\cos 2\pi\Omega_1 t+30\cos 2\pi\Omega_2 t=1+30\cos 2\pi t+30\cos 12\pi t$; therefore, $\Omega_1=1$, which corresponds with $V_1=1$, and $\Omega_2=6$, which corresponds with $V_1=6$. Table 9 contains the values of $V_1(75)$ for all 64 controllable oscillator blocks, which is enough time for $V_1$ to stabilize. None of the controllable oscillator blocks stabilized to any specific value.

TABLE 8

| | | | | | | | |
|---|---|---|---|---|---|---|---|
| 3.2884 | 4.3247 | 4.4232 | 3.5549 | 3.9356 | 0.1092 | 0.1561 | 0.2441 |
| 4.9348 | 4.5821 | 0.7978 | 3.9220 | 4.5248 | 1.0518 | 0.0340 | 0.0929 |
| 3.4544 | 3.0029 | 0.2805 | 0.8117 | 0.0651 | 0.5715 | 8.2646 | 7.0372 |
| 3.5222 | 4.8056 | 3.9275 | 4.5027 | 3.3979 | 0.2792 | 7.4488 | 8.4392 |
| 3.7610 | 3.1204 | 3.7070 | 3.2662 | 4.6461 | 0.3740 | 8.2812 | 7.3206 |
| 3.2877 | 3.8044 | 0.5391 | 0.0442 | 0.2255 | 0.5876 | 7.9362 | 7.3901 |
| 3.9977 | 4.2784 | 0.0924 | 0.2996 | 1.0621 | 0.0618 | 7.2384 | 7.7830 |
| 4.1970 | 4.0731 | 0.7752 | 0.0781 | 0.2364 | 0.5040 | 0.1283 | 0.8772 |

TABLE 9

| | | | | | | | |
|---|---|---|---|---|---|---|---|
| 3.19 | 4.30 | 4.40 | 3.50 | 3.87 | 0.00 | 0.00 | 0.98 |
| 5.14 | 4.60 | 1.00 | 3.85 | 4.53 | 1.00 | 0.00 | 0.00 |
| 3.38 | 2.87 | 0.99 | 1.00 | 0.00 | 1.00 | 8.04 | 6.01 |
| 3.50 | 4.90 | 3.86 | 4.50 | 3.31 | 1.00 | 7.04 | 8.22 |
| 3.19 | 3.73 | 1.00 | 0.00 | 0.98 | 1.00 | 7.68 | 6.94 |
| 3.93 | 4.24 | 0.00 | 1.00 | 1.00 | 0.00 | 6.46 | 7.50 |
| 4.16 | 4.02 | 1.00 | 0.00 | 0.98 | 1.00 | 0.00 | 1.00 |

The four examples demonstrate an effective pattern recognition system, which may be defined as a system that can match observed patterns with previously saved patterns, but does not match observed patterns if no matching patterns exist, and functions properly in the presence of noise or imperfect data. The 64 controllable oscillator blocks worked coherently to correctly identify when $\Omega_1=4$, when $\Omega_2=8$, or both, and correctly reject when $\Omega_1=2$ and $\Omega_2=6$, all in the presence of initial values that were fairly noisy.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a first plurality of controllable oscillator blocks, wherein each of the first plurality of controllable oscillator blocks is adapted to provide a first output signal having at least one output frequency in response to a first stimulation signal, such that the first output signal is in a frequency locking range when the first stimulation signal is within a stable region, and is in a non-frequency locking range when the first stimulation signal is within a non-stable region; and
   a control system adapted to receive the first output signal of the each of the first plurality of controllable oscillator blocks and provide a system signal based on processing the at least one output frequency of the first output signal.

2. The system of claim 1 wherein:
   the first stimulation signal comprises at least one initialization control signal, which is used to adjust initialization parameters of the each of the first plurality of controllable oscillator blocks; and
   the at least one output frequency is further based on the initialization parameters.

3. The system of claim 1 wherein:
   the first stimulation signal comprises at least one common forcing signal;
   the at least one output frequency is further based on the at least one common forcing signal; and
   the at least one common forcing signal establishes at least one basin of attraction within the each of the first plurality of controllable oscillator blocks.

4. The system of claim 1 wherein:
   the first stimulation signal comprises at least one initialization control signal, which is used to adjust initialization parameters of the each of the first plurality of controllable oscillator blocks;

the first stimulation signal further comprises at least one common forcing signal; and the at least one output frequency is further based on the initialization parameters and the at least one common forcing signal.

5. The system of claim 1 wherein the each of the first plurality of controllable oscillator blocks comprises a homeostatic mechanism.

6. The system of claim 5 wherein the each of the first plurality of controllable oscillator blocks further comprises an escapement mechanism.

7. The system of claim 6 wherein the escapement mechanism comprises a circuit having at least one positive resistance region.

8. The system of claim 7 wherein the circuit has at least one negative resistance region.

9. The system of claim 1 wherein the each of the first plurality of controllable oscillator blocks comprises a voltage controlled oscillator neuron (VCON) controllable oscillator block.

10. The system of claim 1 wherein the first plurality of controllable oscillator blocks is used as a matching element in an associative memory system.

11. The system of claim 1 wherein the first stimulation signal of the each of the first plurality of controllable oscillator blocks is based on a common forcing signal.

12. The system of claim 1 wherein the first stimulation signal of one of the first plurality of controllable oscillator blocks is based on a second stimulation signal, and the first stimulation signal of another of the first plurality of controllable oscillator blocks is based on a third stimulation signal.

13. The system of claim 1 wherein the first stimulation signal of the each of the first plurality of controllable oscillator blocks is a function of at least one stimulation signal that is based on system input information and provided by the control system.

14. The system of claim 1 further comprising a second plurality of controllable oscillator blocks adapted to receive a second plurality of stimulation signals and provide a second plurality of output signals having a second plurality of output frequencies based on the second plurality of stimulation signals, such that the first stimulation signal of the each of the first plurality of controllable oscillator blocks is a function of certain of the second plurality of output frequencies.

15. The system of claim 14 wherein the control system is further adapted to provide the second plurality of stimulation signals based on system input information.

16. The system of claim 1 further comprising a second controllable oscillator block adapted to receive a second stimulation signal and provide a second output signal having a second output frequency based on the second stimulation signal, such that the first stimulation signal of a first of the first plurality of controllable oscillator blocks is a function of the second output frequency, and the first stimulation signal of a second of the first plurality of controllable oscillator blocks is a function of the second output frequency.

17. The system of claim 16 wherein the first stimulation signal of the first of the first plurality of controllable oscillator blocks and the first stimulation signal of the second of the first plurality of controllable oscillator blocks is based on a common forcing signal having the second output frequency.

18. The system of claim 1 further comprising:

a second controllable oscillator block adapted to receive a second stimulation signal and provide a second output signal having a second output frequency based on the second stimulation signal; and a third controllable oscillator block adapted to receive a third stimulation signal and provide a third output signal having a third output frequency based on the third stimulation signal, wherein the first stimulation signal of one of the first plurality of controllable oscillator blocks is a function of the second output frequency and the third output frequency.

19. The system of claim 18 wherein the first stimulation signal of the one of the first plurality of controllable oscillator blocks is based on a common forcing signal having the second output frequency and the third output frequency.

20. A voltage controlled oscillator neuron (VCON) controllable oscillator block comprising:

a VCON oscillator adapted to:
receive a filtered frequency control signal;
provide an output signal having at least one output frequency, which is based on the filtered frequency control signal and a stimulation signal; and
provide a frequency control signal based on the at least one output frequency; and a feedback filter adapted to:
receive the frequency control signal; and
provide the filtered frequency control signal based on the frequency control signal and filtering characteristics of the feedback filter.

21. The VCON controllable oscillator block of claim 20 wherein:

the stimulation signal comprises at least one initialization control signal, which is used to adjust at least one initialization parameter of the VCON controllable oscillator block;

at least one of the VCON oscillator and the feedback filter is further adapted to receive the at least one initialization control signal; and the at least one output frequency is further based on the at least one initialization parameter.

22. The VCON controllable oscillator block of claim 20 wherein:

the stimulation signal comprises at least one common forcing signal;

at least one of the VCON oscillator and the feedback filter is further adapted to receive the at least one common forcing signal;

the at least one output frequency is further based on the at least one common forcing signal; and the at least one common forcing signal establishes at least one basin of attraction within the VCON controllable oscillator block.

23. The VCON controllable oscillator block of claim 20 wherein:

the stimulation signal comprises at least one initialization control signal, which is used to adjust at least one initialization parameter of the VCON controllable oscillator block;

the stimulation signal further comprises at least one common forcing signal;

at least one of the VCON oscillator and the feedback filter is further adapted to receive the at least one initialization control signal;

at least one of the VCON oscillator and the feedback filter is further adapted to receive the at least one common forcing signal; and the at least one output frequency is further based on the at least one initialization parameter and the at least one common forcing signal.

24. The VCON controllable oscillator block of claim 20 wherein the VCON oscillator comprises an escapement mechanism coupled to a homeostatic mechanism.

25. An associative memory system comprising:
    a first plurality of controllable oscillator blocks, wherein each of the first plurality of controllable oscillator blocks is adapted to provide a first output signal having at least one output frequency in response to a first stimulation signal; and
    a control system adapted to receive the first output signal of the each of the first plurality of controllable oscillator blocks and provide an associative memory signal based on processing the at least one output frequency of the first output signal.

* * * * *